(12) United States Patent
Lee et al.

(10) Patent No.: US 11,929,032 B2
(45) Date of Patent: Mar. 12, 2024

(54) DISPLAY DEVICE

(71) Applicant: Samsung Display Co., LTD., Yongin-si (KR)

(72) Inventors: Hyun Dae Lee, Hwaseong-si (KR); Il Nam Kim, Hwaseong-si (KR); Seung Hyun Moon, Suwon-si (KR); Dong Wook Yang, Suwon-si (KR); Kang Bin Jo, Suwon-si (KR); Go Eun Cha, Suwon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/887,973

(22) Filed: Aug. 15, 2022

(65) Prior Publication Data
US 2023/0154411 A1 May 18, 2023

(30) Foreign Application Priority Data
Nov. 17, 2021 (KR) .................. 10-2021-0158394

(51) Int. Cl.
G06V 40/13 (2022.01)
G09G 3/3266 (2016.01)

(52) U.S. Cl.
CPC ....... *G09G 3/3266* (2013.01); *G06V 40/1318* (2022.01); *G09G 2300/0828* (2013.01); *G09G 2310/0294* (2013.01); *G09G 2310/061* (2013.01); *G09G 2310/08* (2013.01); *G09G 2360/14* (2013.01)

(58) Field of Classification Search
None
See application file for complete search history.

(56) References Cited

U.S. PATENT DOCUMENTS

| 9,342,733 | B2 | 5/2016 | Lee et al. | |
|---|---|---|---|---|
| 10,203,816 | B2 | 2/2019 | Nelson et al. | |
| 10,437,974 | B2 | 10/2019 | He et al. | |
| 2018/0246614 | A1* | 8/2018 | Hu | G09G 3/3258 |
| 2020/0042763 | A1* | 2/2020 | Huang | G09G 3/3406 |
| 2021/0027711 | A1 | 1/2021 | Qin et al. | |
| 2022/0335743 | A1* | 10/2022 | Shih | G06V 40/1306 |
| 2023/0152926 | A1* | 5/2023 | Yoshimoto | G06F 3/0412 |
| | | | | 345/175 |

FOREIGN PATENT DOCUMENTS

| KR | 10-2019-0081730 | 7/2019 |
|---|---|---|
| WO | 2020/165686 | 8/2020 |

* cited by examiner

*Primary Examiner* — Joseph R Haley
(74) *Attorney, Agent, or Firm* — KILE PARK REED & HOUTTEMAN PLLC

(57) ABSTRACT

A display device comprises a display panel which comprises scan lines, sensing lines, pixels electrically connected to each of the scan lines, and photo sensors electrically to each of the scan lines and the sensing lines, a scan driver which outputs scan signals to the scan lines according to a scan control signal, a timing controller which outputs the scan control signal to the scan driver, and a readout circuit which receives light sensing signals of the photo sensors from the sensing lines. The timing controller sets a frame frequency of the scan control signal to a first frame frequency in a first mode in which the display panel displays an image. The timing controller sets the frame frequency of the scan control signal to a second frame frequency in a second mode in which the photo sensors sense a fingerprint.

21 Claims, 14 Drawing Sheets

DISPLAY DEVICE

CROSS-REFERENCE TO RELATED APPLICATION(S)

This application claims priority to and benefits of Korean Patent Application No. 10-2021-0158394 under 35 U.S.C. § 119, filed on Nov. 17, 2021, in the Korean Intellectual Property Office, the entire contents of which are incorporated herein by reference.

BACKGROUND

1. Technical Field

The disclosure relates to a display device.

2. Description of the Related Art

As the information society develops, demands for display devices for displaying; images are increasing in various forms. For example, display devices are being applied to various electronic devices such as smartphones, digital cameras, notebook computers, navigation devices, smart watches, and smart televisions. The display devices may be flat panel display devices such as liquid crystal display devices, field emission display devices, and organic light emitting display devices.

Recently, utilizing a fingerprint, which is one of biometric information, to protect personal information or to unlock a display screen has been proposed for display devices. Accordingly, there is an increasing demand for display devices having a fingerprint recognition function. Research and development are being conducted on a technology for integrating sensors for touch recognition or fingerprint recognition in a display device.

It is to be understood that this background of the technology section is, in part, intended to provide useful background for understanding the technology. However, this background of the technology section may also include ideas, concepts, or recognitions that were not part of what was known or appreciated by those skilled in the pertinent art prior to a corresponding effective filing date of the subject matter disclosed herein.

SUMMARY

An aspect of the disclosure is to improve the fingerprint recognition of a display device having a photo sensor performing a fingerprint sensing function.

However, aspects of the disclosure are not restricted to the one set forth herein. The above and other aspects of the disclosure will become more apparent to one of ordinary skill in the art to which the disclosure pertains by referencing the detailed description of the disclosure given below.

According to the embodiments of the disclosure, a display device may comprise a display panel which comprises scan lines, sensing lines, pixels electrically connected to each of the scan lines, and photo sensors electrically connected to each of the scan lines and the sensing lines, a scan driver which outputs scan signals to the scan lines according to a scan control signal, a timing controller which outputs the scan control signal to the scan driver, and a readout circuit which receives light sensing signals of the photo sensors from the sensing lines. The timing controller may set a frame frequency of the scan control signal to a first frame frequency in a first mode in which the display panel displays an image. The timing controller may set the frame frequency of the scan control signal to a second frame frequency in a second mode in which the photo sensors sense a fingerprint.

In an embodiment, first frame frequency may be greater than the second frame frequency.

In an embodiment, n may be a positive integer. The scan lines may comprise a first scan line which provides an n-th scan signal to the pixels and the photo sensors, and a second scan line which provides an (n+1)-th scan signal to the pixels. A first horizontal period between the n-th scan signal and the (n+1)-th scan signal may be shorter than a second horizontal period between the n-th scan signal and the (n+1)th scan signal in the second mode.

In an embodiment the second mode may comprise a reset period in which the photo sensors are reset by a reset signal, a light exposure period in which the photo sensors are exposed to external light, and a fingerprint readout period in which a fingerprint is read by the readout circuit.

In an embodiment, the frame frequency of the scan control signal may be set to the first frame frequency in the reset period and the light exposure period. The frame frequency of the scan control signal may be set to the second frame frequency in the fingerprint readout period.

In an embodiment, the display device may comprise a reset driver outputting the reset signal for turning on a reset transistor of each of the photo sensors for fingerprint sensing in case that a user's touch is sensed.

In an embodiment, the readout circuit may output a first switch signal and may output a second switch signal. The first switch signal, a scan signal among the scan signals, and the second switch signal are turned on sequentially. The readout circuit may a noise voltage according to the first switch signal and may store a sensing signal voltage according to the second switch signal.

In an embodiment, a driving frequency of each of the first switch signal and the second switch signal output by the readout circuit, and a driving frequency of the scan signal may be substantially a same frequency in the second mode.

In an embodiment, the display device may comprise a processor which receives fingerprint sensing data from the readout circuit. The processor may transmit a first mode control signal having the first frame frequency in case that a user's touch is not sensed. The processor may transmit a second mode control signal having the second frame frequency in case that the user's touch is sensed.

In an embodiment, the first mode control signal may comprise a first vertical synchronization signal having the first frame frequency, and a first horizontal synchronization signal having the first frame frequency. The second mode control signal may comprise a second vertical synchronization signal having the second frame frequency, and a second horizontal synchronization signal having the second frame frequency.

In an embodiment, the timing controller may comprise a timing modulator which receives control signals having the first frame frequency from the processor, and modulates the control signals into control signals having the second frame frequency in case that a user's touch is sensed.

In an embodiment, the timing controller comprises a frame memory which receives an image signal having the first frame frequency from the processor and stores the image signal. The frame memory provides the image signal to the timing modulator. The timing modulator modulates the image signal into an image signal having the second frame frequency in case that a user's touch is sensed.

According to the embodiments of the disclosure, a display device may comprise a display panel which comprises a pixel and a photo sensor, first scan lines which provide a first scan signal to the pixel and the photo sensor, second scan lines which provide a second scan signal to the pixel, a scan driver which outputs the first scan signal to the first scan lines and outputs the second scan signal to the second scan lines, a timing controller which controls the scan driver, and a readout circuit which receives a light sensing signal from the photo sensor through a sensing line. A pulse interval between the first scan signal and the second scan signal in a first mode in which the display panel displays an image may have a first horizontal period. A pulse interval between the first scan signal and the second scan signal in a second mode in which the photo sensor senses a fingerprint may have a second horizontal period.

In an embodiment, the first horizontal period may be shorter than the second horizontal period.

In an embodiment, the display panel may be controlled with a first frame frequency in the first mode. The display panel may be controlled with a second frame frequency in the second mode.

In an embodiment, the photo sensor may comprise a photoelectric converter which includes an anode and a cathode electrically connected to a voltage line, a first sensing transistor which includes a gate electrode electrically connected to the anode of the photoelectric converter, a reset transistor which electrically connects a reset voltage line and the anode of the photoelectric converter according to a reset signal, and a second sensing transistor which electrically connects the first sensing transistor and the sensing line according to the first scan signal.

In an embodiment, the readout circuit may comprise an amplifier which is electrically connected to the sensing line and includes a first operational amplifier, a sample/hold circuit, and an analog-digital (AD) converter which converts a measured sensing signal voltage into digital data. The sample/hold circuit may comprise a first sampling capacitor storing a noise voltage according to a first switch signal, and a second sampling capacitor storing a sensing signal voltage according to a second switch signal.

In an embodiment, the first switch signal, the first scan signal, and the second switch signal may be turned on sequentially.

In an embodiment, a sensing signal voltage may be output through the sensing line in proportion to an amount of light sensed by the photo sensor in case that the second sensing transistor is turned on according to the first scan signal. The sensing signal voltage may be stored in the second sampling capacitor according to the second switch signal In an embodiment, a pulse interval between the first switch signal and an adjacent first switch signal may have the second horizontal period. A pulse interval between the second switch signal and an adjacent first switch signal each may have the second horizontal period.

BRIEF DESCRIPTION OF THE DRAWINGS

The above and other aspects and features of the disclosure will become more apparent by describing in detail embodiments thereof with reference to the attached drawings, in which.

DETAILED DESCRIPTION OF THE EMBODIMENTS

Figure 1:
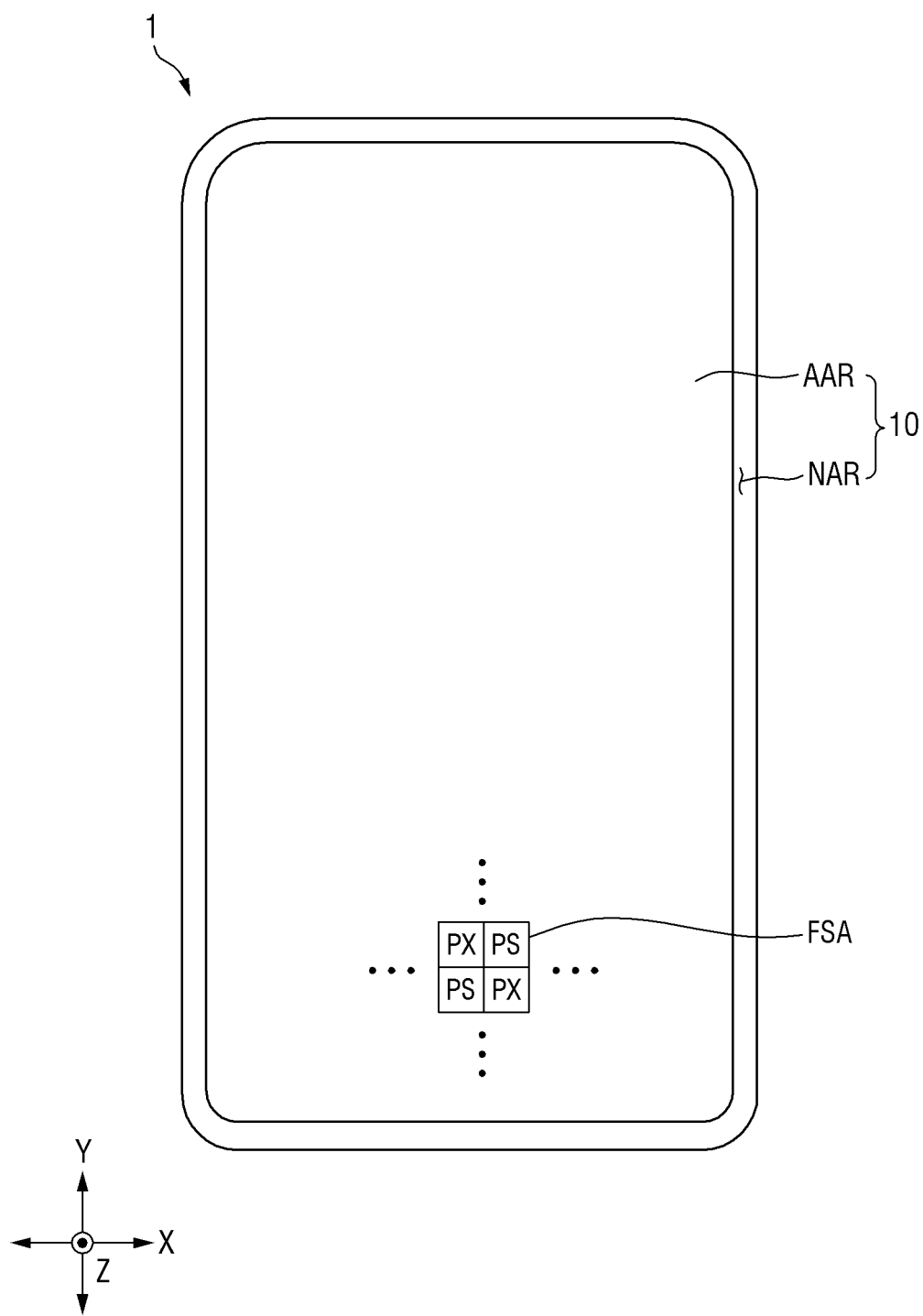
FIG. 1 is a schematic plan view of a display device according to an embodiment.

The disclosure will now be described more fully hereinafter with reference to the accompanying drawings, in which embodiments are shown. This disclosure may, however, be embodied in different forms and should not be construed as limited to the embodiments set forth herein. Rather, these embodiments are provided so that this disclosure will be thorough and complete, and will fully convey the scope of the disclosure to those skilled in the art.

As used herein, the singular forms, "a," "an," and "the" are intended to include the plural forms as well, unless the context clearly indicates otherwise.

In the specification and the claims, the term "and/or" is intended to include any combination of the terms "and" and "or" for the purpose of its meaning and interpretation. For example, "A and/or B" may be understood to mean "A, B, or A and B." The terms "and" and "or" may be used in the conjunctive or disjunctive sense and may be understood to be equivalent to "and/or."

In the specification and the claims, the phrase "at least one of" is intended to include the meaning of "at least one selected from the group of" for the purpose of its meaning and interpretation. For example, "at least one of A and B" may be understood to mean "A, B, or A and B."

It will be understood that, although the terms first, second, etc., may be used herein to describe various elements, these elements should not be limited by these terms. These terms are only used to distinguish one element from another element. For example, a first element may be referred to as a second element, and similarly, a second element may be referred to as a first element without departing from the scope of the disclosure.

"About," "substantially," or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

It will be understood that when an element (or a region, a layer, a portion, or the like) is referred to as "being on," "connected to" or "coupled to" another element in the specification, it can be directly disposed on, connected or coupled to another element mentioned above, or intervening elements may be disposed therebetween.

It will be understood that the terms "connected to" or "coupled to" may include a physical or electrical connection or coupling.

Embodiments may be described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies.

In the case of the blocks, units, and/or modules being implemented by microprocessors or other similar hardware, they may be programmed and controlled using software (for example, microcode) to perform various functions discussed herein and may optionally be driven by firmware and/or software. It is also contemplated that each block, unit, and/or module may be implemented by dedicated hardware, or as a combination of dedicated hardware to perform some functions and a processor (for example, one or more programmed microprocessors and associated circuitry) to perform other functions. Each block, unit, and/or module of embodiments may be physically separated into two or more interacting and discrete blocks, units, and/or modules without departing from the scope of the disclosure. Further, the blocks, units, and/or modules of embodiments may be physically combined into more complex blocks, units, and/ or modules without departing from the scope of the disclosure.

Unless otherwise defined or implied herein, all terms (including technical and scientific terms) used herein have the same meaning as commonly understood by one of ordinary skill in the art to which the disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a schematic plan view of a display device 1 according to an embodiment.

In FIG. 1, a first direction X, a second direction Y, and a third direction Z are shown. The first direction X may be a direction parallel to a side of the display device 1 when seen in a plan view and may be, for example, a horizontal direction of the display device 1. The second direction Y may be a direction parallel to another side in contact with the above side of the display device 1 when seen in a plan view and may be a vertical direction of the display device 1. For ease of description, a side in the first direction X is referred to as a right direction in a plan view, the other side in the first direction X is referred to as a left direction in a plan view, a side in the second direction Y is referred to as an upward direction in a plan view, and the other side in the second direction Y is referred to as a downward direction in a plan view. The third direction Z may be a thickness direction of the display device 1. However, directions mentioned in embodiments should be understood as relative directions, and the embodiments are not limited to the mentioned directions.

Referring to FIG. 1, examples of the display device 1 may include various electronic devices that provide a display screen. Examples of the display device 10 may include, but are not limited to, mobile phones, smartphones, tablet personal computers (PCs), mobile communication terminals, electronic notebooks, electronic books, personal digital assistants (PDAs), portable multimedia players (PMPs), navigation devices, ultra-mobile PCs (UMPCs), televisions, game consoles, wristwatch-type electronic devices, head mounted displays, monitors of PCs, notebook computers, car dashboards, digital cameras, camcorders, external billboards, electronic boards, various medical devices, various inspection devices, various home appliances including a display area such as refrigerators and washing machines, and Internet of things (IoT) devices. Examples of the display device 1 to be described later may include, but are not limited to, smartphones, tablet PCs, and notebook computers.

The display device 1 includes a display panel 10 having an active area AAR and a non-active area NAR.

The active area AAR includes a display area in which a screen is displayed. The active area AAR may completely overlap the display area. Pixels PX displaying an image may be disposed in the display area. Each pixel PX may include a light emitting element EL (refer to FIG. 5).

The active area AAR further includes a fingerprint sensing area FSA. The fingerprint sensing area FSA is an area that reacts to light and an area that senses the amount or wavelength of incident light. The fingerprint sensing area FSA may overlap the display area. Although the fingerprint sensing area FSA is disposed in a lower central part of the active area AAR in the drawing, the disclosure is not limited thereto. For example, the fingerprint sensing area FSA may also be defined as an area substantially the same as the display area in a plan view. In another example, the fingerprint sensing area FSA may be disposed only in a limited area necessary for fingerprint recognition. The fingerprint sensing area FSA may overlap a part of the display area but may not overlap the other part of the display area.

Photo sensors PS that react to light may be disposed in the fingerprint sensing area FSA. Each of the photo sensors PS may include a photoelectric converter PD (refer to FIG. 5) that senses incident light and converts the incident light into an electrical signal.

The non-active area NAR is disposed around the active area AAR. The non-active area NAR may be a bezel area. The non-active area NAR may surround all sides (four sides in the drawing) of the active area AAR, but the disclosure is not limited thereto.

In the non-active area NAR, signal wirings or driving circuits for transmitting signals to the active area AAR may be disposed. Signal wirings or driving circuits for transmitting signals to the fingerprint sensing area FSA and fingerprint sensing wirings for transmitting electrical signals received from the fingerprint sensing area FSA may be disposed in the non-active area NAR. The non-active area NAR may not include the display area. Furthermore, the non-active area NAR may not include the fingerprint sensing area FSA. In an embodiment, the non-active area NAR may include a part of the fingerprint sensing area FSA. The non-active area NAR may also be an area exactly the same as a non-display area in which a screen is not displayed.

Figure 2:
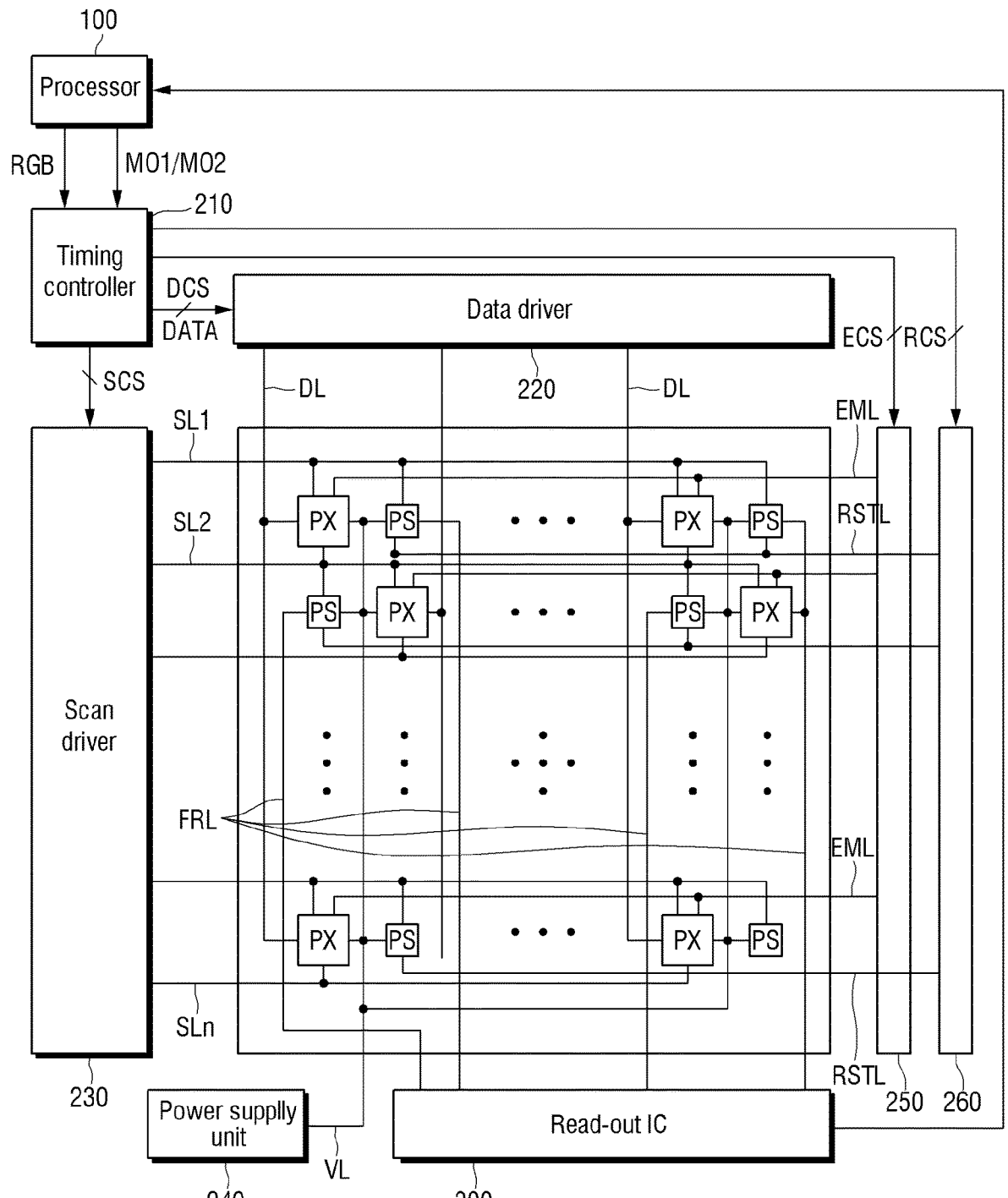
FIG. 2 is a block diagram of the display device according to the embodiment.
Figure 3:
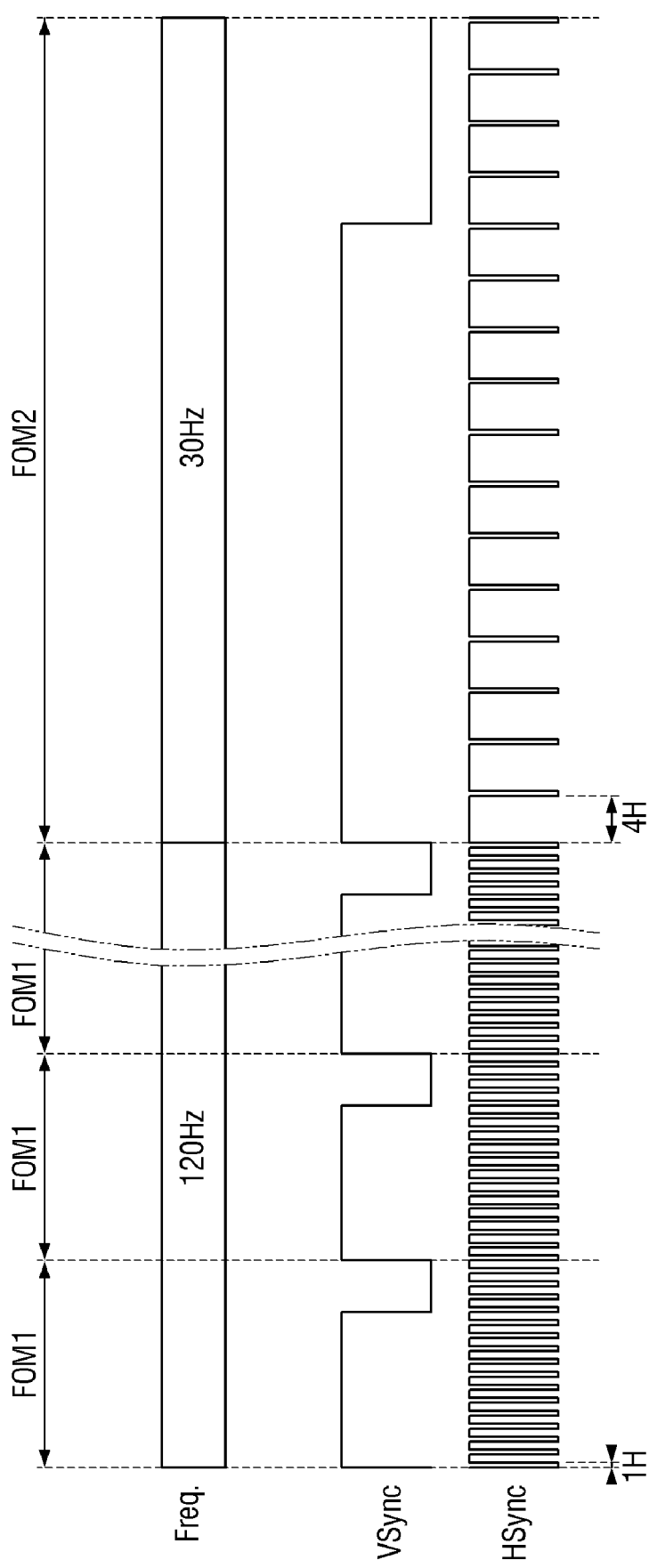
FIG. 3 is a timing diagram illustrating a driving period of the display device according to the embodiment.

FIG. 2 is a block diagram of the display device 1 according to the embodiment. FIG. 3 is a timing diagram illustrating a driving period of the display device 1 according to the embodiment.

The display device 1 according to the current embodiment includes a processor 100, a display driving circuit 200, and a readout circuit 300.

The processor 100 supplies an image signal RGB and control signals supplied from the outside to a timing controller 210. The processor 100 may further include a graphics processing unit (GPU) that provides graphics for the image signal RGB received from the outside. The image signal RGB may be an image source on which graphics processing has been completed by the GPU and may be provided to the timing controller 210. The image signal RGB may have a frequency of, for example, about 120 Hz. In another example, the image signal RGB may have a frequency of about 30 Hz.

In the display device 1 according to the current embodiment, the control signals include a first mode control signal MO1, a second mode control signal MO2, a clock signal, and an enable signal. The first mode control signal MO1 may include a first vertical synchronization signal Vsync1 and a first horizontal synchronization signal Hsync1, and the second mode control signal MO2 may include a second vertical synchronization signal Vsync2 and a second horizontal synchronization signal Hsync2.

Referring to FIG. 2 and FIG. 3, each of the vertical synchronization signals Vsync (Vsync1 and Vsync2) defines frame periods. Each of the vertical synchronization signals Vsync includes a high period and a low period in each period, and a period of each of the vertical synchronization signals Vsync corresponds to a frame frequency of each period. For example, the first vertical synchronization signal Vsync1 may define first frame periods FOM1 having a first frame frequency, and the second vertical synchronization signal Vsync2 may define second frame periods FOM2 having a second frame frequency. In the specification, the first frame frequency may be greater than the second frame frequency. For example, the first frame frequency may be about 120 Hz, and the second frame frequency may be about 30 Hz. A period of the first vertical synchronization signal Vsync1 may be shorter than that of the second vertical synchronization signal Vsync2. For example, a period of the first vertical synchronization signal Vsync1 may be about 8.3 ms, and a period of the second vertical synchronization signal Vsync2 may be about 33.2 ms.

Each of the horizontal synchronization signals Hsync (Hsync1 and Hsync2) defines horizontal periods in a single frame period. Each of the horizontal synchronization signals Hsync includes a high period and a low period in each period, and a period of each of the horizontal synchronization signals Hsync corresponds to each of the horizontal periods. For example, the first horizontal synchronization signal Hsync1 may define first horizontal periods 1H, and the second horizontal synchronization signal Hsync2 may define second horizontal period 4H. When the first frame frequency is greater than the second frame frequency, a period of the first horizontal synchronization signal Hsync1 may be shorter than that of the second horizontal synchronization signal Hsync2. For example, a period of the first horizontal synchronization signal Hsync1 may be about 3.2 µs, and a period of the second horizontal synchronization signal Hsync2 may be about 12.8 µs.

Referring to FIG. 2, the processor 100 provides the first mode control signal MO1 to the timing controller 210 that displays an image on the display panel 10. When it determines that there is a user's touch for fingerprint sensing, the processor 100 may provide the second mode control signal MO2 to the timing controller 210. The timing controller 210 drives the pixels PX and the photo sensors PS of the display panel 10 by lowering a driving frequency according to the second mode control signal MO2.

The display driving circuit 200 may generate signals and voltages for driving the pixels PX and the photo sensors PS of the display panel 10. The display driving circuit 200 may be formed as an integrated circuit and may be attached onto a circuit board using a chip on film (COF) method. However, the disclosure is not limited thereto, and the display driving circuit 200 may also be attached onto the non-active area NAR of the display panel 10 using a chip on glass (COG) method, a chip on plastic (COP) method, or an ultrasonic bonding method.

The display driving circuit 200 may include a data driver 220 which drives the pixels PX of the display panel 10, a scan driver 230 which drives the pixels PX and the photo sensors PS, and the timing controller 210 which controls driving timing of the data driver 220 and the scan driver 230. The display driving circuit 200 may include a power supply unit 240, an emission driver 250, and a reset driver 260.

The timing controller 210 may receive the image signal RGB, the first mode control signal MO1, and the second mode control signal MO2 supplied from the outside of the display device 1. The timing controller 210 may output image data DATA and a data control signal DCS to the data driver 220. The timing controller 210 may generate a scan control signal SCS for controlling the operation timing of the scan driver 230, an emission control signal ECS for controlling the operation timing of the emission driver 250, and a reset control signal RCS for controlling the operation timing of the reset driver 260. For example, the timing controller 210 may generate the scan control signal SCS, the emission control signal ECS and the reset control signal RCS, output the scan control signal SCS to the scan driver 230 through a scan control line, output the emission control signal ECS to the emission driver 250 through an emission control line, and output the reset control signal RCS to the reset driver 260 through a reset control line.

When the first mode control signal MO1 is received, the timing controller 210 drives the pixels PX and the photo sensors PS of the display panel 10 at the first frame frequency. When the second mode control signal MO2 is received, the timing controller 210 drives the pixels PX and the photo sensors PS of the display panel 10 at the second frame frequency which is a lower frequency than the first frame frequency. For example, the timing controller 210 may output the scan control signal SCS, the data control signal DCS, the emission control signal ECS, and the reset control signal RCS according to the first frame frequency. In another example, the timing controller 210 may output the scan control signal SCS, the data control signal DCS, the emission control signal ECS, and the reset control signal RCS according to the second frame frequency.

The data driver 220 may convert the image data DATA into analog data voltages and output the analog data voltages to data lines DL. The data driver 220 may convert the image data DATA into the analog data voltages based on the first mode control signal MO1 and the second mode control signal MO2.

The scan driver 230 may generate scan signals according to the scan control signal SCS and sequentially output the scan signals to scan lines SL1 through SLn. For example, the scan driver 230 may receive the scan control signal SCS for the first frame frequency and may output scan signals according to the first frame frequency. The scan driver 230 may receive the scan control signal SCS for the second frame frequency (FOM2) and may output scan signals according to the second frame frequency.

The power supply unit 240 may generate a first driving voltage and supply the first driving voltage to driving voltage lines VL and may generate a second driving voltage and supply the second driving voltage to the driving voltage lines VL. The driving voltage lines VL may include a first driving voltage line and a second driving voltage line. The first driving voltage may be a high potential voltage for driving light emitting elements and photoelectric converters, and the second driving voltage may be a low potential voltage for driving the light emitting elements and the photoelectric converters. The first driving voltage may have a higher electrical potential than the second driving voltage.

The emission driver 250 may generate emission signals according to the emission control signal ECS and sequentially output the emission signals to emission lines EML. For example, the emission driver 250 may receive the emission control signal ECS according to the first frame frequency and may output emission signals according to the first frame frequency. The emission driver 250 receives the emission control signal ECS according to the second frame frequency and outputs emission signals according to the second frame frequency. Although the emission driver 250 is illustrated as a separate component from the scan driver 230, the disclosure is not limited thereto, and the emission driver 250 may also be included in the scan driver 230.

The reset driver 260 may generate reset signals according to the reset control signal RCS and sequentially output the reset signals to reset lines RSTL. For example, the reset driver 260 receives the reset control signal RCS according to the first frame frequency and outputs reset signals according to the first frame frequency. The reset driver 260 receives the reset control signal RCS according to the second frame frequency and outputs reset signals according to the second frame frequency.

The readout circuit 300 may be electrically connected to each photo sensor PS through a fingerprint sensing line FRL and may receive a current flowing through each photo sensor PS to sense a user's fingerprint input. The readout circuit 300 may be an integrated circuit attached onto a display circuit board using a COF method. However, the disclosure is not limited thereto, and the readout circuit 300 may also be attached onto the non-active area NAR of the display panel 10 using a COG method, a COP method, or an ultrasonic bonding method.

The readout circuit 300 may generate fingerprint sensing data according to the magnitude of a current sensed by each photo sensor PS and transmit the fingerprint sensing data to the processor 100. The processor 100 may analyze the fingerprint sensing data and determine whether the fingerprint sensing data matches a user's fingerprint by comparing the fingerprint sensing data with a preset fingerprint. When the preset fingerprint and the fingerprint sensing data transmitted from the readout circuit 300 are the same, preset functions may be performed. The preset functions may include various functions such as unlocking a screen and/or an application of the display device, or approving a purchase. The display panel 10 further includes pixels PX, photo sensors PS, scan lines SL1 through SLn electrically connected to the pixels PX and the photo sensors PS, data lines DL and emission lines EML electrically connected to the pixels PX, and fingerprint sensing lines FRL and reset lines RSTL electrically connected to the photo sensors PS.

Each of the pixels PX may include a light emitting element and transistors for controlling the amount of light emitted from the light emitting element. Each of the pixels PX may be electrically connected to at least one of the scan lines SL1 through SLn, any one of the data lines DL, at least one of the emission lines EML, and the driving voltage lines VL.

Each of the photo sensors PS may include a photoelectric converter and transistors for controlling the amount of light received by the photoelectric converter. Each of the photo sensors PS may be electrically connected to any one of the scan lines SL1 through SLn, any one of the reset lines RSTL, any one of the fingerprint sensing lines FRL, and a driving voltage line VL.

The scan lines SL1 through SLn may electrically connect the scan driver 230 to the pixels PX and the photo sensors PS. The scan lines SL1 through SLn may provide scan signals output from the scan driver 230 to the pixels PX and the photo sensors PS.

The data lines DL may electrically connect the data driver 220 to the pixels PX. The data lines DL may provide image data output from the data driver 220 to the pixels PX.

The emission lines EML may electrically connect the emission driver 250 to the pixels PX. The emission lines EML may provide emission signals output from the emission driver 250 to the pixels PX.

The reset lines RSTL may electrically connect the reset driver 260 to the photo sensors PS. The reset lines RSTL may provide reset signals output from the reset driver 260 to the photo sensors PS. The fingerprint sensing lines FRL may electrically connect the photo sensors PS to the readout circuit 300. The fingerprint sensing lines FRL may provide a photocurrent output from each of the photo sensors PS to the readout circuit 300. Accordingly, the readout circuit 300 may sense a user's fingerprint.

The driving voltage lines VL may electrically connect the power supply unit 240 to the pixels PX and the photo sensors PS. The driving voltage lines VL may provide the first driving voltage or the second driving voltage from the power supply unit 240 to the pixels PX and the photo sensors PS.

Figure 4:
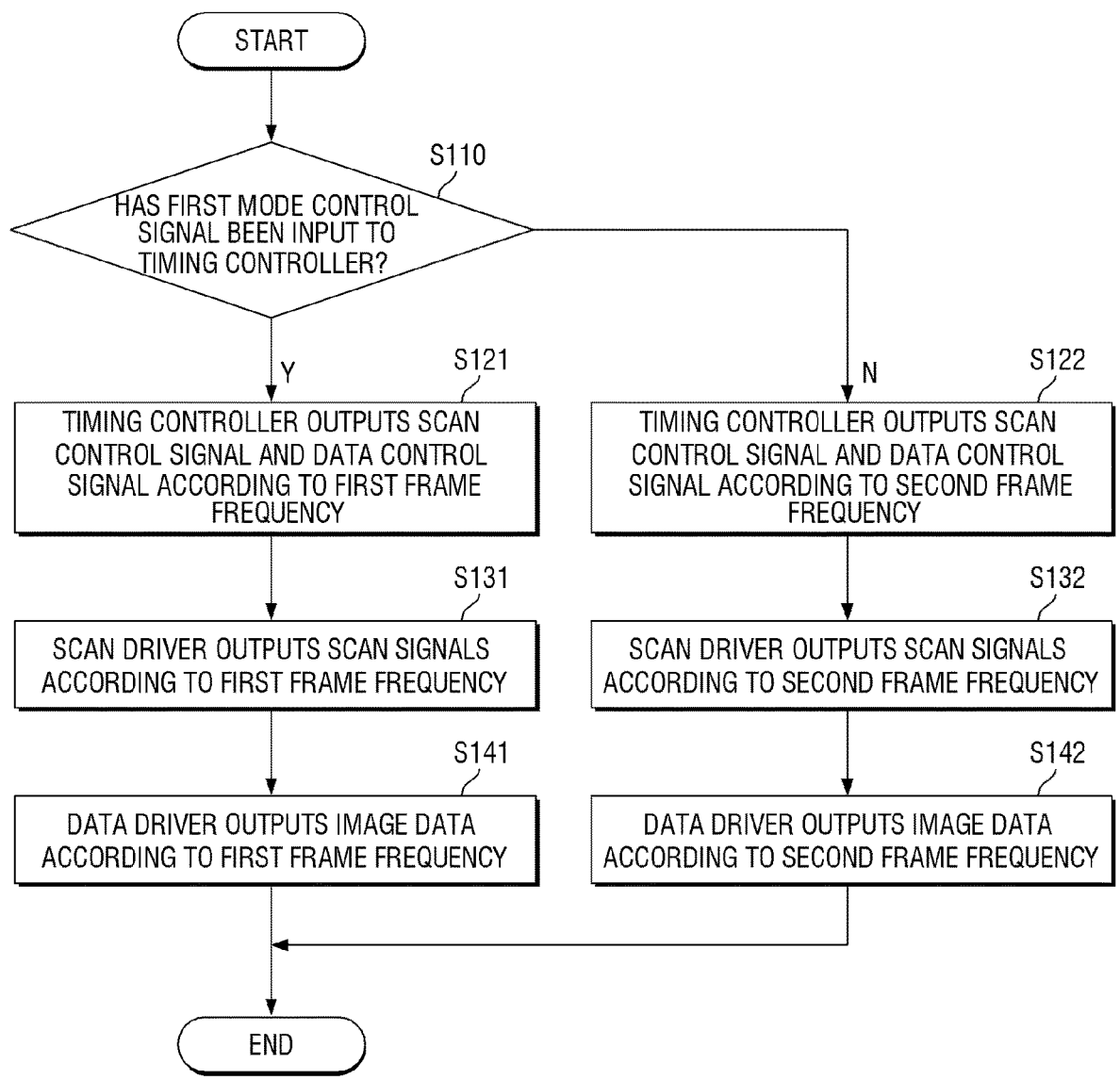
FIG. 4 is a flowchart illustrating a method of driving a display panel according to an embodiment.

FIG. 4 is a flowchart illustrating a method of driving a display panel 10 according to an embodiment. The operation of the timing controller 210, the scan driver 230 and the data driver 220 of the display panel 10 according to a first mode and a second mode will be described with reference to FIG. 4 and FIG. 2.

The processor 100 provides the first mode control signal MO1 to the timing controller 210 in case that a user's touch is not sensed and provides the second mode control signal MO2 in case that the user's touch is sensed. When the first mode control signal MO1 is input to the timing controller 210 (operation S110: YES), the timing controller 210 may output the scan control signal SCS and the data control signal DCS according to the first frame frequency (operation S121). The scan driver 230 receiving the scan control signal SCS according to the first frame frequency may output scan signals according to the first frame frequency (operation S131). The data driver 220 receiving the data control signal DCS according to the first frame frequency may output image data according to the first frame frequency (operation S141). The emission control signal ECS and the reset control signal RCS may be transmitted to the emission driver 250 and the reset driver 260 according to the first frame frequency as described above. Accordingly, the timing controller 201 may control the pixels PX and the photo sensors PS of the display panel 10 according to the first mode. In the first mode, the pixels PX of the display panel 10 may display an image according to the first frame frequency. However, in the first mode, the display panel 10 may not be provided with valid fingerprint sensing data. In the first mode, the readout circuit 300 does not recognize signals generated by the photo sensors PS as fingerprint sensing data. For example, signals generated by the photo sensors PS in the first mode may be noise signals not stored in a memory of the readout circuit 300.

When the second mode control signal MO2, not the first mode control signal MO1, is input to the timing controller 210 (operation S110: NO), the timing controller 210 may output the scan control signal SCS and the data control signal DCS according to the second frame frequency (operation S122). The scan driver 230 receiving the scan control signal SCS according to the second frame frequency may output scan signals according to the second frame frequency (operation S132). The data driver 220 receiving the data control signal DCS according to the second frame frequency may output image data according to the second frame frequency (operation S142). The emission control signal ECS and the reset control signal RCS may also be transmitted to the emission driver 250 and the reset driver 260 according to the second frame frequency (refer to FIG. 2). Accordingly, the timing controller 210 may control the pixels PX and the photo sensors PS of the display panel 10 according to the second mode. In the second mode, the pixels PX of the display panel 10 may display an image according to the second frame frequency and the photo sensors PS may be provided with valid fingerprint sensing data. This is because the driving frequency of the display panel 10 is lowered in a fingerprint readout period ROP (refer to FIG. 7) during which fingerprint sensing signals are read out according to the second mode control signal MO2. When the driving frequency of the display panel 10 is lowered, the readout circuit 300 may recognize fingerprint sensing signals generated by the photo sensors PS as valid fingerprint sensing data. For example, the fingerprint sensing signals generated by the photo sensors PS in the second mode may be fingerprint sensing signals stored in the memory of the readout circuit 300.

In case that a user's touch is sensed, the processor 100 changes the first mode control signal MO1 to the second mode control signal MO2 and provides the second mode control signal MO2. When the driving frequency is lowered according to the second mode control signal MO2, the fingerprint readout period ROP of the photo sensors PS may be extended. When the fingerprint readout period ROP of the photo sensors PS is extended, a period during which an amplifier 310 (refer to FIG. 9) of the readout circuit 300 may accumulate a sensing signal voltage Vsignal may increase, thereby increasing the sensing signal voltage Vsignal. This will be described in detail with reference to FIG. 9.

Figure 5:
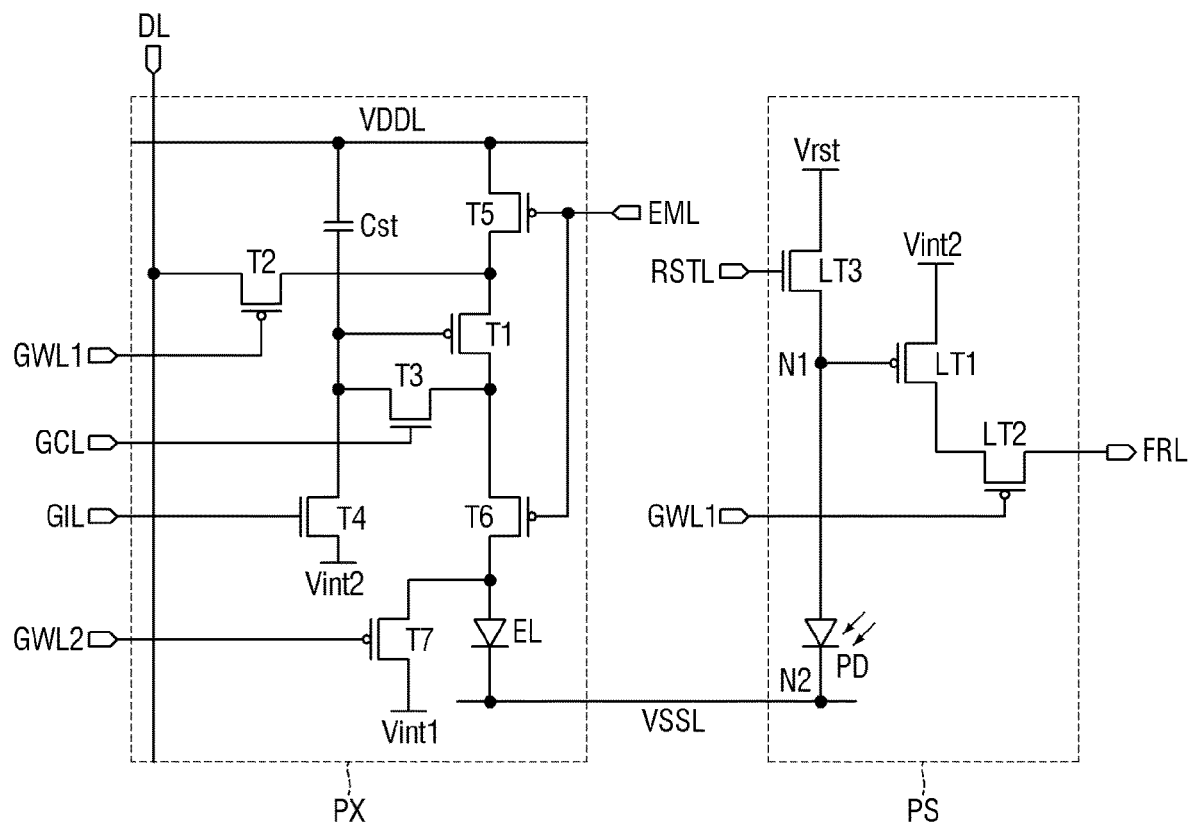
FIG. 5 is a schematic diagram of an equivalent circuit of a pixel and a photo sensor according to an embodiment.

FIG. 5 is a schematic diagram of an equivalent circuit of a pixel PX and a photo sensor PS according to an embodiment.

Each of the pixels PX may be electrically connected to a scan start line GIL, a scan control line GCL, a first scan write line GWL1, a second scan write line GWL2, an emission line EML, and a data line DL. Each of the pixels PX may be electrically connected to a first driving voltage line VDDL to which the first driving voltage is applied, a second driving voltage line VSSL to which the second driving voltage is applied, a first initialization voltage line to which a first initialization voltage Vint1 is applied, and a second initialization voltage line to which a second initialization voltage line Vint2 is applied.

Each of the photo sensors PS may be electrically connected to the first scan write line GWL1, a reset line RSTL, and a fingerprint sensing line FRL. Each of the photo sensors PS may be electrically connected to the second driving voltage line VSSL to which the second driving voltage is applied, a reset voltage line to which a reset voltage Vrst is applied, and the second initialization voltage line to which the second initialization voltage Vint2 is applied.

Each of the pixels PX may include transistors, a light emitting element EL, and at least one capacitor Cst. The transistors may include first through seventh transistors T1, T2, T3, T4, T5, T6, and T7. The first transistor T1 may be a driving transistor, and the second through seventh transistors T2, T3, T4, T5, T6, T7 may be transistors serving as switch elements that are turned on or off according to a scan signal transmitted to their respective gate electrodes.

The first transistor T1 may include a gate electrode, a first electrode, and a second electrode. The first transistor T1 may control a source-drain current Isd (not illustrated; hereinafter, referred to as a "driving current Isd") according to a data voltage applied to the gate electrode. The driving current Isd flowing through a channel of the first transistor T1 is proportional to the square of a difference between a voltage between a source electrode and the gate electrode of the first transistor T1 and an absolute value of a threshold voltage as shown in Equation 1.

$$Isd = k' \times (Vsg - |Vth|)^2 \tag{1}$$

in Equation 1, k' is a proportional coefficient determined by the structure and physical characteristics of the first transistor T1, Vsg is the source-gate voltage of the first transistor T1, and Vth is the threshold voltage of the first transistor T1.

The first transistor T1 may have the gate electrode electrically connected to a first electrode of the third transistor T3 and one electrode of the capacitor Cst, the first electrode electrically connected to a second electrode of the second transistor T2 and a second electrode of the fifth transistor T5, and the second electrode electrically connected to a second electrode of the third transistor T3 and a first electrode of the sixth transistor T6.

The light emitting element EL emits light according to the driving current Isd. The amount of light emitted from the light emitting element EL may be proportional to the driving current Isd.

The light emitting element EL may be an organic light emitting diode including an anode, a cathode, and an organic light emitting layer disposed between the anode and the cathode. In another example, the light emitting element EL may be an inorganic light emitting diode including an anode, a cathode and an inorganic light emitting layer disposed between the anode and the cathode or may be a quantum dot light emitting element EL including a quantum dot light emitting layer disposed between an anode and a cathode. In other examples, the light emitting element EL may be a micro-light emitting diode.

The anode of the light emitting element EL may be electrically connected to a second electrode of the sixth transistor T6 and a second electrode of the seventh transistor T7, and the cathode of the light emitting element EL may be electrically connected to the second driving voltage line VSSL.

The second transistor T2 may be turned on by a scan signal of the first scan write line GWL1 to electrically connect the first electrode of the first transistor T1 and the data line DL. The second transistor T2 may have a gate electrode electrically connected to the first scan write line GWL1, a first electrode electrically connected to the data line DL, and the second electrode electrically connected to the first electrode of the first transistor T1.

The third transistor T3 may be turned on by a scan signal of the scan control line GCL to electrically connect the gate electrode and the second electrode of the first transistor T1. When the third transistor T3 is turned on, the gate electrode and the second electrode of the first transistor T1 are electrically connected. Thus, the first transistor T1 may operate as a diode. The third transistor T3 may have a gate electrode electrically connected to the scan control line GCL, the first electrode electrically connected to the second electrode of the first transistor T1, and the second electrode electrically connected to the gate electrode of the first transistor T1.

The fourth transistor T4 may be turned on by a scan signal of the scan start line GIL to electrically connect the gate electrode of the first transistor T1 and the second initialization voltage line. The gate electrode of the first transistor T1 may be discharged to the second initialization voltage Vint2 of the second initialization voltage line. The fourth transistor T4 may have a gate electrode electrically connected to the scan start line GIL, a first electrode electrically connected to the second initialization voltage line, and a second electrode electrically connected to the gate electrode of the first transistor T1.

The fifth transistor T5 may be turned on by an emission signal of the emission line EML to electrically connect the first electrode of the first transistor T1 and the first driving voltage line VDDL. The fifth transistor T5 may have a gate electrode electrically connected to the emission line EML, a first electrode electrically connected to the first driving voltage line VDDL, and the second electrode electrically connected to the first electrode of the first transistor T1.

The sixth transistor T6 may be turned on by the emission signal of the emission line EML to electrically connect the second electrode of the first transistor T1 and the anode of the light emitting element EL. The sixth transistor T6 may have a gate electrode electrically connected to the emission line EML, the first electrode electrically connected to the second electrode of the first transistor T1, and the second electrode electrically connected to the anode of the light emitting element EL.

When both the fifth transistor T5 and the sixth transistor T6 are turned on, the driving current Isd may be supplied to the light emitting element EL.

The seventh transistor T7 may be turned on by a scan signal of the second scan write line GWL2 to electrically connect the first initialization voltage line and the anode of the light emitting element EL. The anode of the light emitting element EL may be discharged to the first initialization voltage Vint1. The seventh transistor T7 may have a gate electrode electrically connected to the second scan write line GWL2, a first electrode electrically connected to the first initialization voltage line, and the second electrode electrically connected to the anode of the light emitting element EL.

The capacitor Cst may be formed between the gate electrode of the first transistor T1 and the first driving voltage line VDDL. One electrode of the capacitor Cst may be electrically connected to the gate electrode of the first transistor, and the other electrode may be electrically connected to the first driving voltage line VDDL. Therefore, the capacitor Cst may maintain a potential difference between the gate electrode of the first transistor T1 and the first driving voltage line VDDL.

Each of the photo sensors PS may include sensing transistors and a photoelectric converter PD. The sensing transistors may include first through third sensing transistors LT1 through LT3. Each of the photo sensors PS may include a first node N1 between the first sensing transistor LT1, the third sensing transistor LT3 and the photoelectric converter PD and a second node N2 between the second driving voltage line VSSL and the photoelectric converter PD. The first sensing transistor LT1 may be a driving transistor, and the second and third sensing transistors LT2 and LT3 may be transistors serving as switch elements that are turned on or off according to a reset signal and a scan signal transmitted to their respective gate electrodes.

When light emitting elements EL and photoelectric converters PD are disposed together in a single display panel 10, voltage wirings or signal wirings for driving the light emitting elements EL may also be used to drive the photoelectric converters PD. The addition of voltage wirings or signal wirings for driving the photoelectric converters PD to the display panel 10 may be minimized to increase the resolution of the display panel 10 and minimize the bezel area. For example, a signal wiring electrically connected to the gate electrode of the second transistor T2 of each pixel PX may also be a signal wiring electrically connected to a gate electrode of the second sensing transistor LT2 of each photo sensor PS. The gate electrode of the second transistor T2 and the gate electrode of the second sensing transistor LT2 may be electrically connected to the first scan write line GWL1. In another example, the second driving voltage line VSSL may be a common voltage line electrically connected to the cathode of the light emitting element EL and a cathode of the photoelectric converter PD. In another example, the second initialization voltage line that applies the second initialization voltage Vint2 may be a common voltage wiring electrically connected to a second electrode of the first sensing transistor LT1 of each photo sensor PS and the second electrode of the fourth transistor T4.

Each of the photoelectric converters PD may be a light receiving diode including an anode, a cathode, and a photoelectric conversion layer disposed between the anode and the cathode. Each of the photoelectric converters PD may convert light incident from the outside into an electrical signal. Each of the photoelectric converters PD may be a light receiving diode or a phototransistor made of a pn-type or a pin-type inorganic material. In other examples, each of the photoelectric converters PD may be an organic light receiving diode including an electron donor material that generates donor ions and an electron acceptor material that generates acceptor ions.

The anode of the photoelectric converter PD may be electrically connected to the first node N1, and the cathode may be electrically connected to the second node N2.

The photoelectric converter PD may generate photocharges when exposed to external light, and the generated photocharges may be accumulated in the anode of the photoelectric converter PD. The voltage of the first node N1 electrically connected to the anode may increase. When the photoelectric converter PD and the fingerprint sensing line FRL are electrically connected according to the turn-on of the first and second sensing transistors LT1 and LT2, a current may flow through the fingerprint sensing line FRL in proportion to the voltage of the first node N1 in which electric charges are accumulated.

The first sensing transistor LT1 may be turned on by the voltage of the first node N1 applied to a gate electrode to electrically connect the second initialization voltage line and a second electrode of the second sensing transistor LT2. The second electrode of the second sensing transistor LT2 may be discharged to the second initialization voltage Vint2. The first sensing transistor LT1 may have the gate electrode electrically connected to the first node N1, a first electrode electrically connected to the second initialization voltage line, and the second electrode electrically connected to a first electrode of the second sensing transistor LT2. The first sensing transistor LT1 may be a source follower amplifier that generates a source-drain current in proportion to the amount of charge of the first node N1 input to the gate electrode. The first electrode of the first sensing transistor LT1 may also be electrically connected to the first driving voltage line VDDL or the first initialization voltage line.

The second sensing transistor LT2 may be turned on by the scan signal of the first scan write line GWL1 to electrically connect the second electrode of the first sensing transistor LT1 and the fingerprint sensing line FRL. The fingerprint sensing line FRL may transmit a fingerprint sensing signal to the readout circuit 300 (refer to FIG. 2). The second sensing transistor LT2 may have the gate electrode electrically connected to the first scan write line GWL1, the first electrode electrically connected to the second electrode of the first sensing transistor LT1, and the second electrode electrically connected to the fingerprint sensing line FRL.

The third sensing transistor LT3 may be turned on by a reset signal of the reset line RSTL to reset the first node N1 to the reset voltage Vrst. The third sensing transistor LT3 may have a gate electrode electrically connected to the reset line RSTL, a first electrode electrically connected to the reset voltage line, and a second electrode electrically connected to the first node N1. When the reset driver 260 outputting the reset signal of the reset line RSTL is omitted, the third sensing transistor LT3 may be turned on by a scan signal.

When the first electrode of each of the first through seventh transistors T1 through T7 and the first through third sensing transistors LT1 through LT3 is a source electrode, the second electrode may be a drain electrode. In other examples, when the first electrode of each of the first through seventh transistors T1 through T7 and the first through third sensing transistors LT1 through LT3 is a drain electrode, the second electrode may be a source electrode.

An active layer of each of the first through seventh transistors T1 through T7 and the first through third sensing transistors LT1 through LT3 may be made of any one of polysilicon, amorphous silicon, and an oxide semiconductor.

For example, the first and second transistors T1 and T2, the fifth through seventh transistors T5 through T7, and the first and second sensing transistors LT1 and LT2 may be P-type transistors. The active layer of each of the first and second transistors T1 and T2, the fifth through seventh transistors T5 through T7, and the first and second sensing transistors LT1 and LT2 may be made of polysilicon. Each of the third transistor T3, the fourth transistor T4, and the third sensing transistor LT3 may be an N-type transistor that forms an active layer of an oxide semiconductor.

However, embodiments are not limited thereto, and each of the first through seventh transistors T1 through T7 and the first through third sensing transistors LT1 through LT3 may also be a P-type transistor. In another example, the first through third sensing transistors LT1 through LT3 may be formed as P-type transistors. Timing diagrams of FIGS. 6 and 7 may be modified to suit the characteristics of each transistor.

Figure 6:
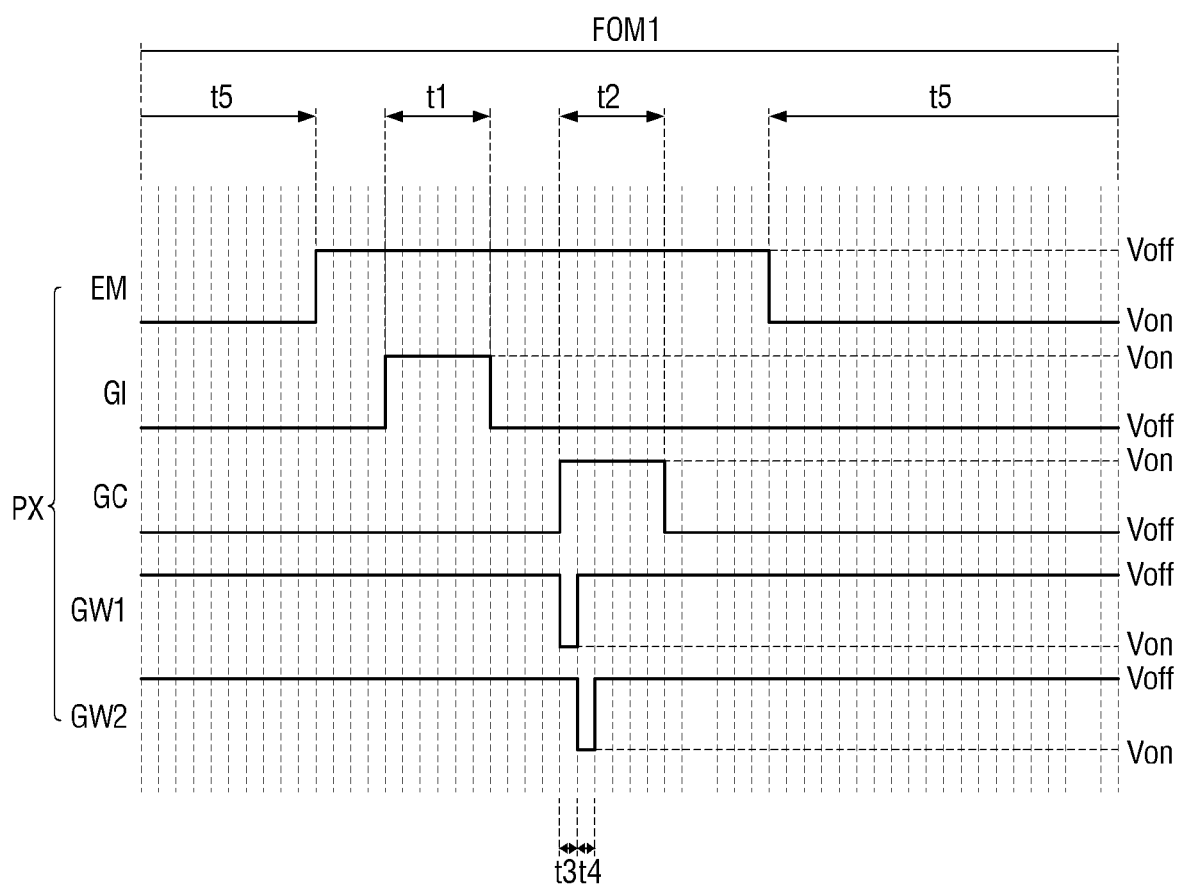
FIG. 6 is a timing diagram for explaining the operation of the pixel illustrated in FIG. 5 according to a first mode.

FIG. 6 is a timing diagram for explaining the operation of the pixel PX illustrated in FIG. 5 according to the first mode.

Referring to FIGS. 5 and 6, an emission signal EM may be transmitted to the emission line EML and may control the turn-on and turn-off of the fifth transistor T5 and the sixth transistor T6. A scan start signal GI may be transmitted to the scan start line GIL and may control the turn-on and turn-off of the fourth transistor T4. A scan control signal GC may be transmitted to the scan control line GCL and may control the turn-on and turn-off of the third transistor T3. A first scan write signal GW1 may be transmitted to the first scan write line GWL1 and may control the turn-on and turn-off of the second transistor T2 and the second sensing transistor LT2. A second scan write signal GW2 may be transmitted to the second scan write line GWL2 and may control the turn-on and turn-off of the seventh transistor T7.

The emission signal EM, the scan start signal GI, the scan control signal GC, the first scan write signal GW1, and the second scan write signal GW2 may be repeated with a cycle of one frame period. For example, when the display panel 10 is driven according to the first mode, one frame period may correspond to a first frame period FOM1 having the first frame frequency. In another example, when the display panel 10 is driven according to the second mode, one frame period may correspond to a second frame period FOM2 (refer to FIG. 3) having the second frame frequency.

According to the operation of the pixel PX, the first frame period FOM1 may be divided into a first period t1 in which the voltage of the gate electrode of the first transistor T1 is initialized to the second initialization voltage Vint2, a second period t2 and a third period t3 in which a data voltage is supplied to the first electrode of the first transistor T1 and the threshold voltage of the first transistor T1 is sampled, a fourth period t4 in which the voltage of the anode of the light emitting element EL is initialized to the first initialization voltage Vint1, and a fifth period t5 in which the light emitting element EL emits light.

The scan start signal GI may have a gate-on voltage Von during the first period t1 and a gate-off voltage Voff during the other periods. The scan control signal GC may have the gate-on voltage Von during the second period t2 and the gate-off voltage Voff during the other periods. The first scan write signal GW1 may have the gate-on voltage Von during the third period t3 and the gate-off voltage Voff during the other periods. The second scan write signal GW2 may have the gate-on voltage Von during the fourth period t4 and the gate-off voltage Voff during the other periods. The emission signal EM may have the gate-on voltage Von during the fifth period t5 and the gate-off voltage Voff during the other periods.

The gate-on voltage Von of each of the scan start signal GI and the scan control signal GC may be a gate-high voltage, and the gate-off voltage Voff may be a gate-low voltage. The gate-on voltage Von of each of the first and second scan write signals GW1 and GW2 and the emission signal EM may be a gate-low voltage, and the gate-off voltage Voff may be a gate-high voltage.

During the first period t1, the scan start signal GI having the gate-on voltage Von is supplied to the scan start line GIL. During the first period t1, the fourth transistor T4 is turned on by the scan start signal GI. Due to the turn-on of the fourth transistor T4, the gate electrode of the first transistor T1 is initialized to the second initialization voltage Vint2 of the second initialization voltage line.

During the second period t2, the scan control signal GC having the gate-on voltage Von is supplied to the scan control line GCL. Accordingly, the third transistor T3 electrically connected to the scan control line GCL is turned on to electrically connect the gate electrode and the second electrode of the first transistor T1, and the first transistor T1 operates a diode.

During the third period t3, the first scan write signal GW1 having the gate-on voltage Von is supplied to the first scan write line GWL1. Accordingly, the second transistor T2 electrically connected to the first scan write line GWL1 is turned on, and a data voltage Vdata is supplied to the first electrode of the first transistor T1. Here, since a voltage (Vsg=Vdata−Vint2) between the first electrode and the gate electrode of the first transistor T1 is less than an absolute value of the threshold voltage Vth, the first transistor T1 forms a current path until the voltage Vsg between the gate electrode and the source electrode of the first transistor T1 reaches the absolute value of the threshold voltage Vth. Therefore, the voltage Vsg between the gate electrode and the first electrode of the first transistor T1 may increase to a difference voltage (Vdata-|Vth|) between the data voltage Vdata and the absolute value of the threshold voltage Vth of the first transistor T1 during the third period t3. "Vdata-|Vth|" may be stored in the capacitor Cst.

Since the first transistor T1 is formed as a P-type transistor, the driving current Isd of the first transistor T1 may be proportional to a voltage Vsd between the source electrode and the drain electrode of the first transistor T1 in a period in which the voltage Vsd between the source electrode and the drain electrode of the first transistor T1 is greater than 0 V. The threshold voltage Vth of the first transistor T1 may be less than 0 V.

During the fourth period t4, the second scan write signal GW2 having the gate-on voltage Von is supplied to the second scan write line GWL2. Therefore, the seventh transistor T7 electrically connected to the second scan write line GWL2 is turned on. Accordingly, the anode of the light emitting element EL is initialized to the first initialization voltage Vint1 of the first initialization voltage line.

During the fifth period t5, the emission signal EM having the gate-on voltage Von is supplied to the emission line EML. During the fifth period t5, each of the fifth transistor T5 and the sixth transistor T6 is turned on by the emission signal EM. Due to the turn-on of the fifth transistor T5, the first electrode of the first transistor T1 is electrically connected to the first driving voltage line VDDL. Due to the turn-on of the sixth transistor T6, the second electrode of the first transistor T1 is electrically connected to the anode of the light emitting element EL.

When the fifth transistor T5 and the sixth transistor T6 are turned on, the driving current Isd flowing according to the voltage of the gate electrode of the first transistor T1 may be supplied to the light emitting element EL. The driving current Isd may be defined as in Equation 2:

$$Isd = K' \times (ELVDD - (Vdata - |Vth|) - |Vth|)^2 \quad (2).$$

In Equation 2, K' is a proportional coefficient determined by the structure and physical characteristics of the first transistor T1, Vth is the threshold voltage of the first transistor T1, ELVDD is the first driving voltage ELVDD of the first driving voltage line ELVDDL, and Vdata is a data voltage. A gate voltage of the first transistor T1 is Vdata-|Vth|, and the voltage of the first electrode is ELVDD. Equation 2 is rearranged into Equation 3:

$$Isd = K' \times (ELVDD - Vdata)^2 \quad (3).$$

The driving current Isd may not depend on the threshold voltage Vth of the first transistor T1 as shown in Equation 3. The threshold voltage Vth of the first transistor T1 which is a driving transistor may be compensated, and the light emitting element EL may emit light according to the magnitude of the driving current Isd that is adjusted by the first driving voltage ELVDD and the data voltage.

The operation of a reset signal RST and the first scan write signal GW1 controlling the photo sensor PS is described with reference to FIGS. 5 and 7.

Figure 7:
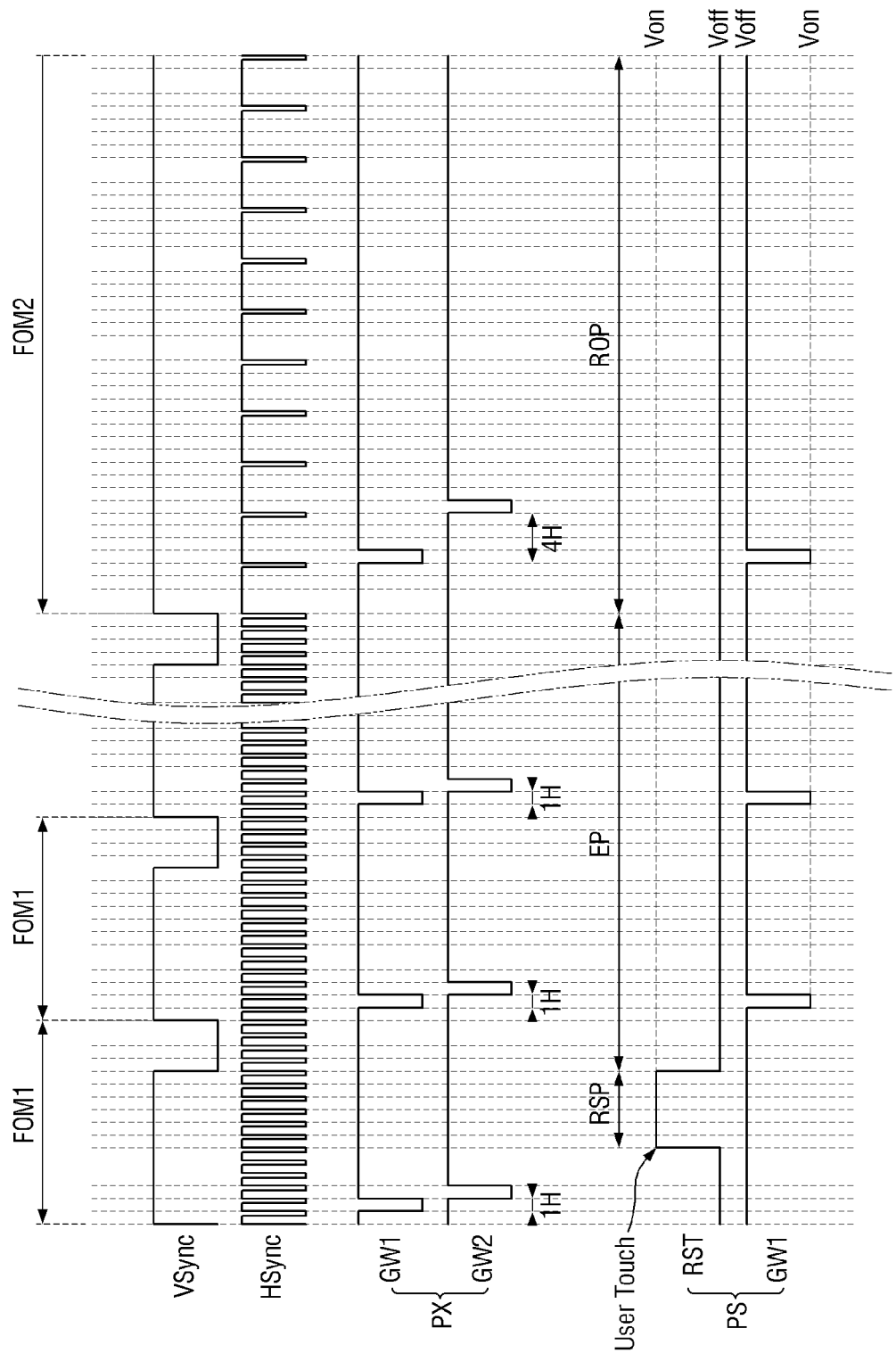
FIG. 7 is a detailed waveform diagram of scan signals of the pixel and a scan signal and a reset signal of the photo sensor of FIG. 5 according to the first mode and a second mode.

FIG. 7 is a detailed waveform diagram of scan signals of the pixel PX and a scan signal and a reset signal of the photo sensor PS of FIG. 5 according to the first mode and the second mode. FIG. 7 illustrates first frame periods FOM1 and one second frame period FOM2.

First, the first scan write signal GW1 is a signal transmitted to the first scan write line GWL1 and a signal for controlling the turn-on and turn-off of the second transistor T2 and the second sensing transistor LT2 as described above. The reset signal RST of the photo sensor PS is a signal transmitted to the reset line RSTL that controls the turn-on and turn-off of the third sensing transistor LT3. The reset signal RST may be a separate signal different from the scan signals. It is possible to independently adjust the reset timing and number of resets of the photo sensor PS by separating the reset signal RST of the photo sensor PS from the scan signals of the pixel PX. For example, the reset signal RST may be output when a user's touch occurs, so that the photo sensor PS can enter a reset period RSP.

One frame period of the photo sensor PS may be divided into the reset period RSP in which the anode of the photoelectric converter PD is reset to the reset voltage Vrst, a light exposure period EP in which the photoelectric converter PD is exposed to external light, photocharges are generated according to the intensity of the external light, and accordingly the voltage of the anode of the photoelectric converter PD and the voltage of the first node N1 increase, and a fingerprint readout period ROP in which the second sensing transistor LT2 is turned on to read a fingerprint according to the magnitude of a current flowing through the fingerprint sensing line FRL.

The reset signal RST may have the gate-on voltage Von during the reset period RSP and the gate-off voltage Voff during the other periods. The gate-on voltage Von of the reset signal RST may be a gate-high voltage, and the gate-off voltage Voff may be a gate-low voltage.

When a user's touch occurs according to a request of the processor 100, the reset period RSP may begin. During the reset period RSP, the reset signal RST having the gate-on voltage Von is supplied to the reset line RSTL. Accordingly, the third sensing transistor LT3 is turned on, and the first node N1 and the anode of the photoelectric converter PD are reset to the reset voltage Vrst. Since the second driving voltage corresponding to a voltage higher than the reset voltage Vrst is applied to the cathode of the photoelectric converter PD and the second node N2, the photoelectric converter PD is kept reverse biased. For example, the voltage level of the first node N1 may be about −6.5 V, and the voltage level of the second node N2 may be about −2.5 V.

During the light exposure period EP, the photoelectric converter PD may be exposed to external light emitted from the light emitting element EL. When a user's touch occurs, the photoelectric converter PD may generate photocharges corresponding to light reflected by ridges of a fingerprint or valleys between the ridges, and a reverse current may be generated in proportion to the amount of photocharges generated. A current flowing from the second node N2 to the first node N1 may be generated. Accordingly, the voltage of the first node N1 may increase. The voltage of the first node N1 may increase until a voltage (Vsg=Vint2-Vg) between the first electrode and the gate electrode of the first sensing transistor LT1 reaches an absolute value of a threshold voltage Vth. When the voltage of the first node N1 reaches the threshold voltage Vth of the first sensing transistor LT1, the first sensing transistor LT1 may be turned on. Since a fingerprint sensing signal increases as the amount of charge charged in the first node N1 increases, the light exposure period EP may be set to a sufficiently long period.

During the fingerprint readout period ROP, the first scan write signal GW1 having the gate-on voltage Von is supplied to the first scan write line GWL1. Accordingly, the second sensing transistor LT2 is turned on, and a fingerprint sensing signal corresponding to a current flowing through the first sensing transistor LT1 may be output to the fingerprint sensing line FRL. The current flowing through the first sensing transistor LT1 is a source-drain current generated in proportion to the amount of charge of the first node N1 input to the gate electrode of the first sensing transistor LT1. Therefore, it is possible to determine ridges or valleys of a fingerprint and sense the fingerprint by sensing a voltage change of the first node N1. A process in which the readout circuit 300 electrically connected to the fingerprint sensing line FRL detects the sensing signal voltage Vsignal during the fingerprint readout period ROP will be described in FIGS. 9 and 10.

A frame period of the photo sensor PS may be different from a frame period of the pixel PX. For example, the light exposure period EP during a frame period of the photo sensor PS may correspond to twelve first frame periods FOM1.

Timing diagrams of the pixel PX and the photo sensor PS according to the first mode and the second mode is described. In the drawing, only the scan write signals GW1 and GW2 of the pixel PX are illustrated, and the other signals are omitted.

The pixel PX and the photo sensor PS of the display panel 10 may be driven at the first frame frequency according to the first mode. When the second mode begins due to sensing of a user's touch, the display panel 10 may receive the first frame frequency during a selected period corresponding to the reset period RSP and the light exposure period EP and may receive the second frame frequency in synchronization with a time when the fingerprint readout period ROP begins. For example, the selected period may be about 100 ms and may correspond to about twelve first frame periods FOM1, but the disclosure is not limited thereto. Accordingly, in the fingerprint readout period ROP, the pixel PX and the photo sensor PS of the display panel 10 may be driven at the second frame frequency. After a second frame period FOM2 elapses, the pixel PX and the photo sensor PS of the display panel 10 may end the second mode and then may be driven again at the first frame frequency according to the first mode.

In the first mode, the display panel 10 receives a vertical synchronization signal Vsync and a horizontal synchronization signal Hsync having the first frame frequency. The pixel PX and the photo sensor PS of the display panel 10 may be driven during the repeated first frame periods FOM1 according to the vertical synchronization signal Vsync and the horizontal synchronization signal Hsync having the first frame frequency. Accordingly, one horizontal period corresponding to an interval between a pulse of the first scan write signal GW1 and a pulse of the second scan write signal GW2 of the pixel PX may have a first horizontal period 1H.

According to the first mode, the display panel 10 may display an image at the first frame frequency. Since the reset signal RST is not output in the first mode, an accurate fingerprint sensing signal may not be measured even if the first scan write signal GW1 is transmitted to the photo sensor PS. For example, since the reset voltage Vrst is not applied to the first node N1, a reverse bias of the photoelectric converter PD may not be formed, and a photocurrent may not be formed even when the photoelectric converter PD is exposed to external light. In another example, even when the reset signal RST is output, the readout circuit 300 (refer to FIG. 2) may not treat signals generated in the first frame periods FOM1 as valid fingerprint sensing data.

In the second mode for sensing a fingerprint, the display panel 10 receives a vertical synchronization signal Vsync and a horizontal synchronization signal Hsync having the second frame frequency. The display panel 10 may be driven according to the vertical synchronization signal Vsync and the horizontal synchronization signal Hsync having the second frame frequency during the second frame period FOM2. Accordingly, one horizontal period corresponding to an interval between a pulse of the first scan write signal GW1 and a pulse of the second scan write signal GW2 may have a second horizontal period 4H.

According to the second mode, the display panel 10 may display an image at the second frame frequency. The display panel 10 may sense a fingerprint in response to a user's touch. Since the first scan write signal GW1 transmitted to the photo sensor PS in the fingerprint readout period ROP has the second horizontal period 4H, the period for fingerprint readout may be extended. Accordingly, the readout circuit 300 can output accurate fingerprint sensing data. This will be described in detail with reference to FIG. 9.

Figure 8:
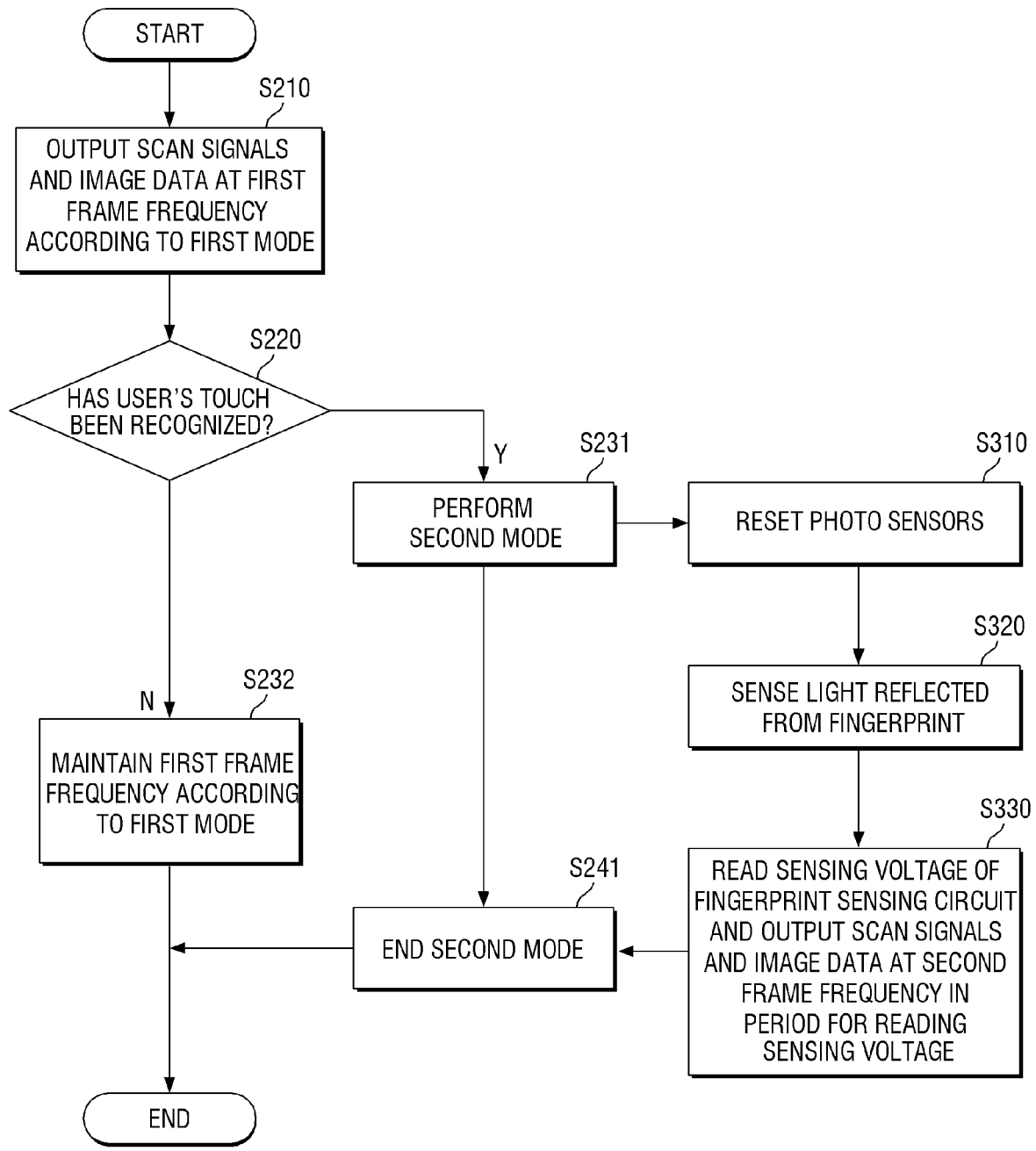
FIG. 8 is a flowchart illustrating a process in which pixels and photo sensors of the display panel are driven in response to a user's touch according to an embodiment.

FIG. 8 is a flowchart illustrating a process in which the pixels PX and the photo sensors PS of the display panel 10 are driven in response to a user's touch according to an embodiment.

Referring to FIGS. 7 and 8, the display panel 10 outputs scan signals (e.g., GW1 or GW2) and image data at the first frame frequency according to the first mode (operation S210). The processor 100 provides the first mode control signal MO1 according to the first frame frequency to the timing controller 210, and the timing controller 210 provides the scan control signal SCS and the data control signal DCS according to the first frame frequency. Accordingly, the scan driver 230 may output scan signals having the first frame frequency, and the data driver 220 may output image data. The scan signals may be transmitted to the pixels PX and the photo sensors PS through the scan lines SL1 through SLn, and the image data may be transmitted to the pixels PX through the data lines DL (refer to FIG. 2).

When a user's touch for fingerprint sensing is recognized (operation S220: YES), the display panel 10 may be driven according to the second mode (operation S231). When the driving of the display panel 10 according to the second mode is terminated, the display panel 10 may be driven again at the first frame frequency according to the first mode (operation S241).

When the second mode is performed in response to the user's touch (operation S231), the photo sensors PS are reset. During the reset period RSP, the reset driver 260 may output the reset signal RST to the reset lines RSTL, and the reset signal RST may be transmitted to each of the photo sensors PS to reset the photo sensor PS. During the reset period RSP, scan signals and image data for displaying an image may be output at the first frame frequency (operation S310 of FIG. 8).

The photo sensors PS sense light reflected from the user's fingerprint. During the light exposure period EP, light reflected from the fingerprint may be incident on the photoelectric converters PD, and photocharges and photocurrents may be generated in proportion to the amount of light reflected. During the light exposure period EP, scan signals and image data for displaying an image may be output at the first frame frequency. One or more first frame periods FOM1 may be repeated during the light exposure period EP (operation S320 of FIG. 8).

The readout circuit 300 reads the sensing signal voltage Vsignal output from each of the fingerprint sensing lines FRL. The fingerprint readout period ROP proceeds. At the same time, the display panel 10 outputs scan signals (e.g., GW1 or GW2) and image data at the second frame frequency according to the second mode. Accordingly, during the fingerprint readout period ROP, scan signals of the photo sensors PS may be output at the second frame frequency (operation S330 of FIG. 8).

The processor 100 provides the first frame frequency for a selected period during the reset period RSP and the light exposure period EP and provides the second frame frequency during the fingerprint readout period ROP.

During the reset period RSP and the light exposure period EP, the timing controller 210 provides the scan control signal SCS and the data control signal DCS according to the first frame frequency in response to a signal of the processor 100. Accordingly, the scan driver 230 may output scan signals at the first frame frequency, and the data driver 220 may output image data at the first frame frequency. Each of the pixels PX may display an image at the first frame frequency.

During the fingerprint readout period ROP, the timing controller 210 provides the scan control signal SCS and the data control signal DCS according to the second frame frequency in response to a signal of the processor 100. Accordingly, the scan driver 230 may output scan signals at the second frame frequency, and the data driver 220 may output image data at the second frame frequency. Each of the pixels PX may display an image at the second frame frequency, and each of the photo sensors PS may sense light at the second frame frequency.

When a user's touch is not recognized (operation 220: NO), the display panel 10 may be driven at the first frame frequency according to the first mode (operation S232).

The operation process of a photo sensor PS and the readout circuit 300 electrically connected to the photo sensor PS in the fingerprint readout period ROP is described with reference to FIGS. 9 and 10.

Figure 9:
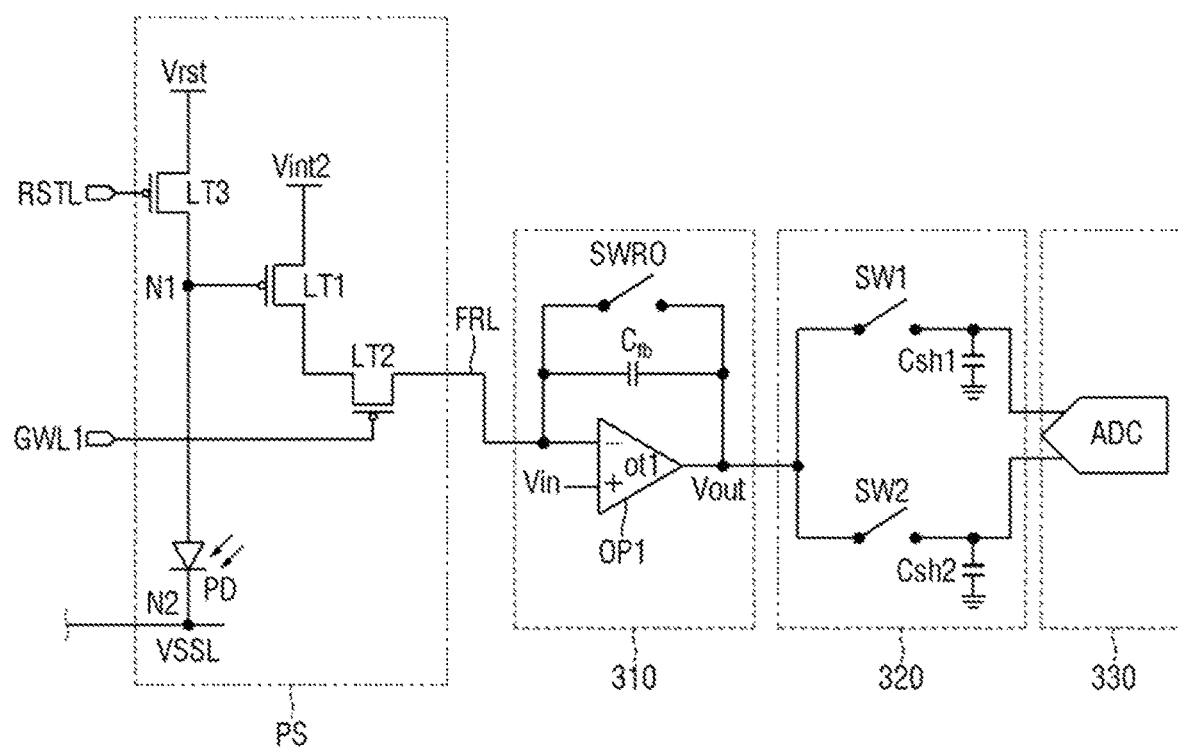
FIG. 9 is a schematic diagram of an equivalent circuit of a photo sensor and a readout circuit.

FIG. 9 is a schematic diagram of an equivalent circuit of a photo sensor PS and the readout circuit 300. FIG. 10 is a waveform diagram of signals of the readout circuit 300 of FIG. 9 and a scan signal according to the fingerprint readout period ROP.

Referring to FIG. 9, the readout circuit 300 may be electrically connected to the photo sensor PS through a fingerprint sensing line FRL. Reference numerals shown in the photo sensor PS are the same as those described above with reference to FIG. 5, thus will be omitted.

The readout circuit 300 may include an amplifier 310 electrically connected to the fingerprint sensing line FRL, a sample/hold circuit 320 storing an output voltage of the amplifier 310, and an analog-digital (AD) converter 330 converting an analog signal corresponding to the output voltage into digital data.

The amplifier 310 may include a first operational amplifier OP1, a feedback capacitor Cfb, and a feedback reset switch SWRO. The first operational amplifier OP1 may include a first input terminal (−), a second input terminal (+), and an output terminal ot1. The first input terminal (−) of the first operational amplifier OP1 may be electrically connected to the fingerprint sensing line FRL, the second input terminal (+) of the first operational amplifier OP1 may be supplied with a predetermined initial voltage Vin, and the output terminal ot1 of the first operational amplifier OP1 may be electrically connected to the sample/hold circuit 320. An output voltage Vout of the first operational amplifier OP1 may be stored in a capacitor of the sample/hold circuit 320. Gain of the first operational amplifier OP1 corresponds to capacitance of the feedback capacitor Cfb. The feedback capacitor Cfb may accumulate a voltage applied through the fingerprint sensing line FRL during one frame period. The applied voltage may be a noise signal voltage or a sensing signal voltage.

The feedback capacitor Cfb and the feedback reset switch SWRO may be electrically connected in parallel between the first input terminal (−) and the output terminal ot1 of the first operational amplifier OP1. The feedback reset switch SWRO controls the connection of both ends of the feedback capacitor Cfb. When the feedback reset switch SWRO is turned on to electrically connect both ends of the feedback capacitor Cfb, the feedback capacitor Cfb may be reset.

The sample/hold circuit 320 may include a first sampling capacitor Csh1, a second sampling capacitor Csh2, a first switch SW1, and a second switch SW2. The sample/hold circuit 320 may sample the output voltage Vout of the first operational amplifier OP1 and hold the sampled output voltage Vout in the first sampling capacitor Csh1 and the second sampling capacitor Csh2.

The first sampling capacitor Csh1 may be electrically connected to the output terminal ot1 of the first operational amplifier OP1 through the first switch SW1. When the first switch SW1 is turned on, a noise signal voltage Vnoise may be stored in the first sampling capacitor Csh1. The second sampling capacitor Csh2 may be electrically connected to the output terminal ot1 of the first operational amplifier OP1 through the second switch SW2. When the second switch SW2 is turned on, the noise signal voltage Vnoise and the sensing signal voltage Vsignal may be stored in the second sampling capacitor Csh2.

The AD converter 330 may convert the voltages stored in the first sampling capacitor Csh1 and the second sampling capacitor Csh2 into digital data by differentiating between the voltages. The AD converter 330 may convert the sensing signal voltage Vsignal into fingerprint sensing data which is digital data by differentiating between the voltages stored in the first sampling capacitor Csh1 and the second sampling capacitor Csh2 and may output the fingerprint sensing data.

Figure 10:
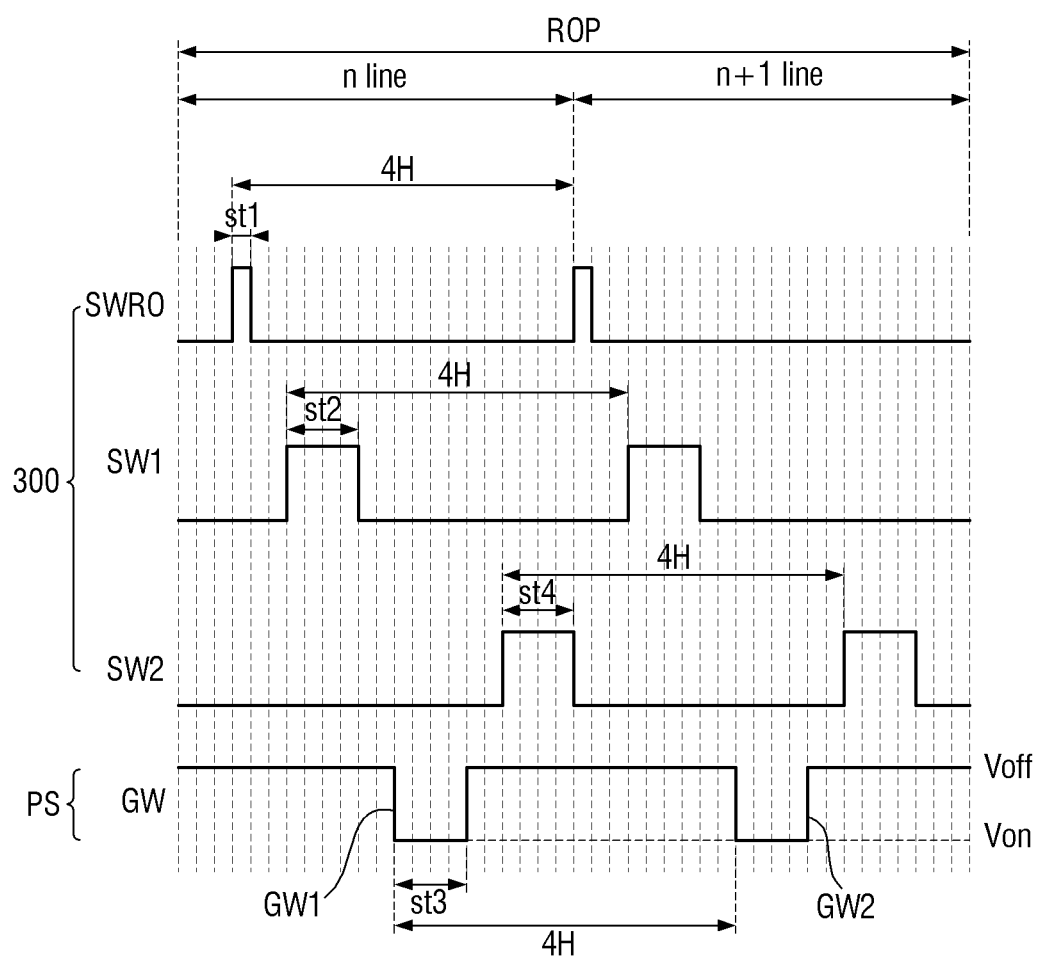
FIG. 10 is a waveform diagram of signals of the readout circuit of FIG. 9 and a scan signal according to a fingerprint readout period.

Referring to FIG. 10, the operation process of the capacitor reset switch SWRO, the first switch SW1 and the second switch SW2 of the readout circuit 300 and the operation process of a scan write signal GW of the photo sensor PS according to the fingerprint readout period ROP are illustrated. FIG. 10 illustrates the operation process of the first scan write signal GW1 transmitted to an $n^{th}$ scan line (where n is a positive integer) and the readout circuit 300 electrically connected to the $n^{th}$ scan line and the operation process of the second scan write signal GW2 transmitted to an $(n+1)^{th}$ scan line and the readout circuit 300 electrically connected to the $(n+1)^{th}$ scan line.

The fingerprint readout period ROP may be divided into a first readout period st1 in which the feedback capacitor Cfb is reset, a second readout period st2 in which a voltage is stored in the first sampling capacitor Csh1, a third readout period st3 in which a photocurrent generated in response to light exposure is output to the readout circuit 300, and a fourth readout period st4 in which a sensing voltage according to the photocurrent is stored in the second sampling capacitor Csh2.

During the first readout period st1, the capacitor reset switch SWRO is turned on. Accordingly, both ends of the feedback capacitor Cfb may be electrically connected to reset the feedback capacitor Cfb. In the first readout period st1, the output voltage Vout of the first operational amplifier OP1 may be substantially the same as the initial voltage Vin of the first input terminal (−).

During the second readout period st2, the capacitor reset switch SWRO is turned off, and the first switch SW1 is turned on. Accordingly, the output terminal ot1 of the first operational amplifier OP1 may be electrically connected to the first sampling capacitor Csh1. Since the second readout period st2 is before the second transistor T2 is turned on, a valid signal is not output through the fingerprint sensing line FRL. Accordingly, the noise signal voltage Vnoise may be stored in the first sampling capacitor Csh1. A voltage of "Vin+Vnoise" may be stored in the first sampling capacitor Csh1.

During the third readout period st3, the first scan write signal GW1 having the gate-on voltage Von is supplied to the first scan write signal GWL1. During the third readout period st3, the second sensing transistor LT2 is turned on by the first scan write signal GW1. Accordingly, the first sensing transistor LT1 may be electrically connected to the fingerprint sensing line FRL, and a photocurent proportional to the voltage charged in the first node N1 may be output to the readout circuit 300 through the fingerprint sensing line FRL. The photocurrent may be stored as the sensing signal voltage Vsignal at the output terminal ot1 of the first operational amplifier OP1.

During the fourth readout period st4, the second switch SW2 is turned on. Accordingly, the output terminal ot1 of the first operational amplifier OP1 may be electrically connected to the second sampling capacitor Csh2. Since the output voltage Vout of the first operational amplifier OP1 corresponds to the sensing signal voltage Vsignal in the fourth readout period st4, the sensing signal voltage Vsignal may be stored in the second sampling capacitor Csh2. A voltage of "Vin+Vnoise+Vsignal" may be stored in the second sampling capacitor Csh2.

The AD converter 330 may convert the sensing signal voltage Vsignal into fingerprint sensing data by differentiating between the voltage stored in the first sampling capacitor Csh1 and the voltage stored in the second sampling capacitor Csh2 and may provide the fingerprint sensing data to the processor 100 (refer to FIG. 2).

When a scan line electrically connected to the photo sensor PS is the same as a scan line electrically connected to a pixel PX, a light sensing operation of the photo sensor PS cannot be performed independently of an image display operation of the pixel PX. For accurate reading of the fingerprint sensing data, the driving frequency of the readout circuit 300 must be the same as the driving frequency of the display panel 10. For example, only when turn-on periods of the feedback reset switch SWRO, the first switch SW1 and the second switch SW2 of the readout circuit 300 and a turn-on period of the second sensing transistor LT2 of the photo sensor PS sequentially proceed as shown in FIG. 10 can fingerprint sensing data be read accurately. According to the current embodiment, the display device 1 may drive the pixel PX and the photo sensor PS of the display panel 10 by changing the driving frequency according to the fingerprint readout period ROP. Since the driving frequency is changed from the first frame frequency to the second frame frequency in the fingerprint readout period ROP, the driving frequencies of the readout circuit 300 and the display panel 10 may become the same, and accordingly, the fingerprint sensing data can be read accurately.

For example, when one horizontal period of each of the feedback reset switch SWRO, the first switch SW1 and the second switch SW2 of the readout circuit 300 has a second horizontal period 4H, one horizontal period of the scan write signal GW for turning on the second sensing transistor LT2 of the photo sensor PS may also have the second horizontal period 4H.

Since the display device 1 according to the current embodiment drives the display panel 10 at the second frame frequency in the fingerprint readout period ROP, the fingerprint readout period ROP may be extended. In the fingerprint readout period ROP, turn-on periods of signals increase, and pulse widths do not increase.

An interval between neighboring pulses of the first switch SW1 may increase, an interval between neighboring pulses of the second switch SW2 may increase, and an interval between the first scan write signal GW1 and the second scan write signal GW2 neighboring each other may increase.

Therefore, an interval between neighboring pulses of the first switch SW1 and the scan write signal GW1 or GW2 may increase, and an interval between neighboring pulses of the scan write signal GW1 or GW2 and the second switch SW2 may increase.

When the interval between the neighboring pulses of the first switch SW1 and the scan write signal GW1 or GW2 and the interval between the neighboring pulses of the scan write signal GW1 or GW2 and the second switch SW2 increase, a period during which a photocurrent applied to the fingerprint sensing line FRL due to the turn-on of the second sensing transistor LT2 by a pulse of the scan write signal GW is charged in the feedback capacitor Cfb may increase. Therefore, the capacitance of the feedback capacitor Cfb may increase, and thus the amount of photocurrent accumulated in the feedback capacitor Cfb after being applied to the fingerprint sensing line FRL may increase.

As described above, by increasing a horizontal period in the fingerprint readout period ROP, it is possible to increase the interval between neighboring pulses of the scan write signal GW and the first switch SW1. Accordingly, a period during which a photocurrent is charged in the feedback capacitor Cfb may increase, thereby increasing the capacitance of the feedback capacitor Cfb and increasing the amount of photocurrent accumulated in the feedback capacitor Cfb. Therefore, the sensing signal voltage Vsignal stored in the second sampling capacitor Csh2 according to the fourth readout period st4 may increase, and thus a signal-to-noise ratio measured in the readout circuit 300 may increase.

Figure 11:
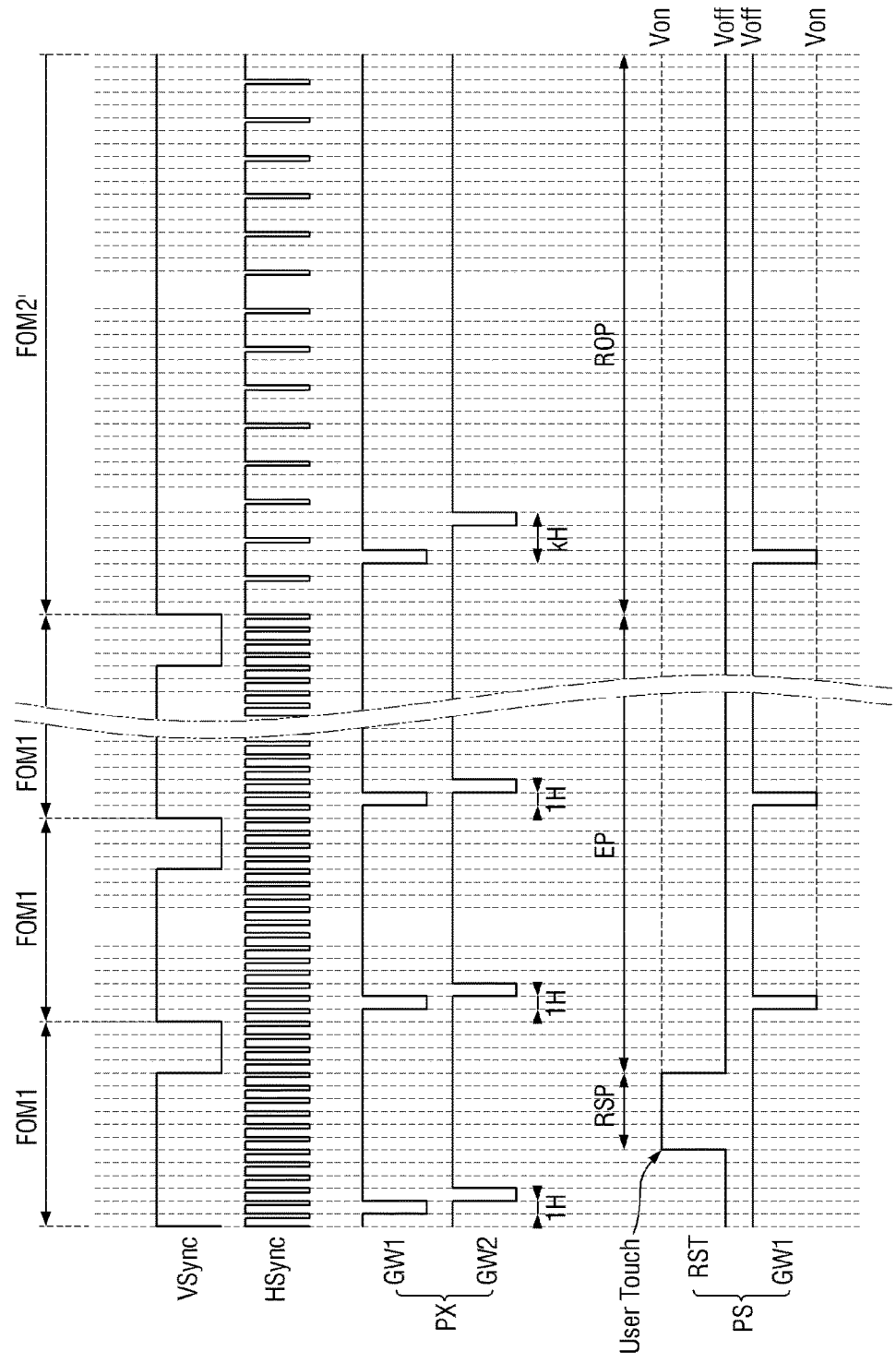
FIG. 11 is a waveform diagram of a pixel and a photo sensor illustrating another example of the second mode.

FIG. 11 is a waveform diagram of a pixel and a photo sensor illustrating another example of the second mode.

Referring to FIG. 11, the second frame frequency according to the second mode may be changed, and accordingly, one frame period and one horizontal period of a second frame period FOM2' may be changed. For example, when the first frame frequency is about 120 Hz, the second frame frequency may be about 40 Hz. A vertical synchronization signal Vsync may be changed from about 8.3 ms to about 24.9 ms. A horizontal synchronization signal Hsync may be changed from about 3.2 μs to about 9.6 μs. A second horizontal period kH may be variously changed according to the original specifications of the readout circuit 300 electrically connected to the display panel 10. When the readout circuit 300 is driven at a driving frequency of about 40 Hz, one horizontal period of switch signals of the readout circuit 300 may be about 9.6 μs. When one horizontal period of a scan write signal GW output in the fingerprint readout period ROP is changed to the second horizontal period kH, it is substantially the same as one horizontal period of the switch signals of the readout circuit 300. Therefore, valid fingerprint sensing data can be output.

The above-described frequency and horizontal period values are merely example numbers used for ease of description. Therefore, they can be changed to various values according to the specifications of the display device 1.

A display device 1 according to an embodiment is described with reference to FIGS. 12 through 14.

Figure 12:
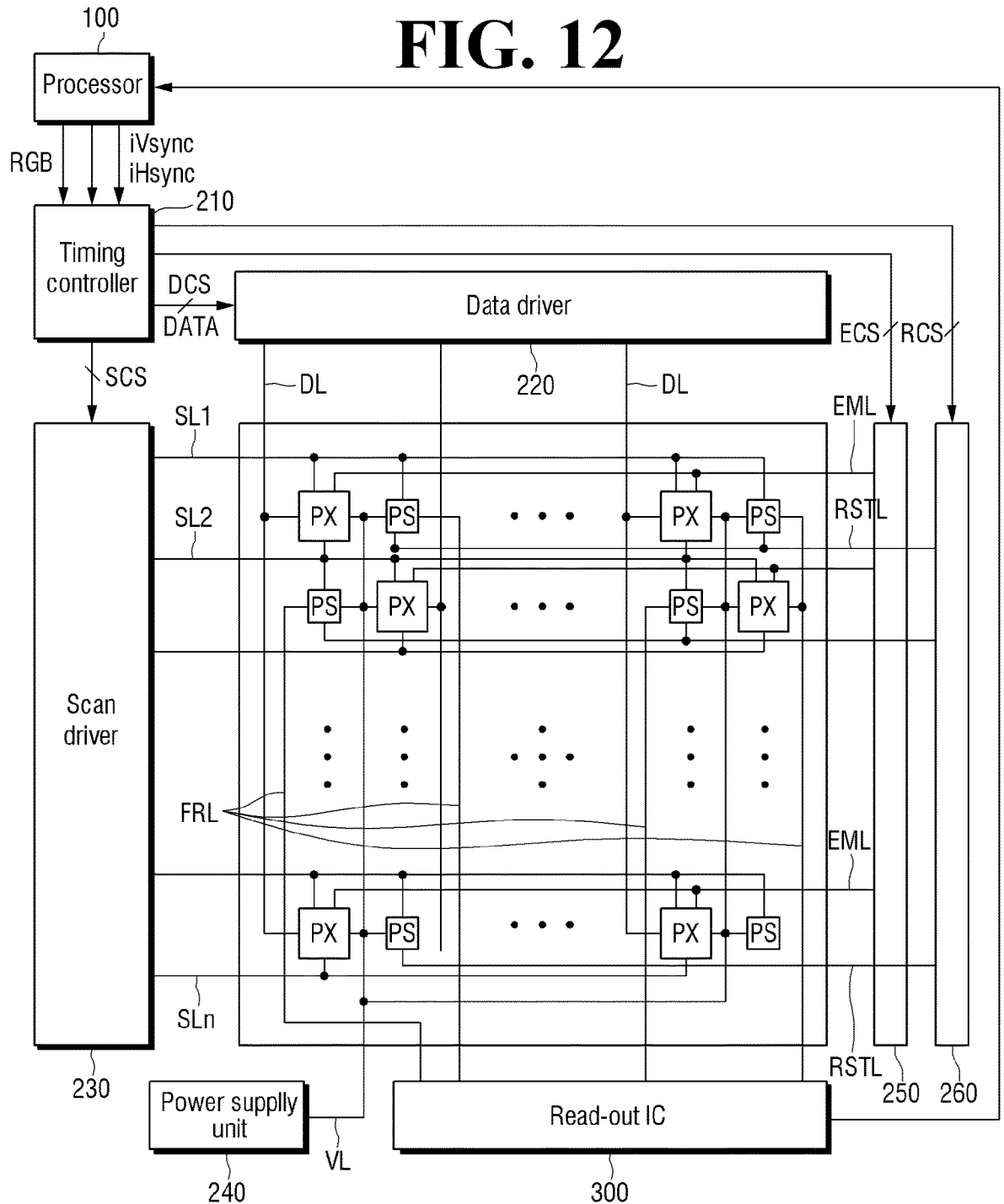
FIG. 12 is a block diagram of a display device according to an embodiment.

FIG. 12 is a block diagram of a display device 1 according to an embodiment. FIG. 13 is a block diagram of a timing controller 210 illustrated in FIG. 12. FIG. 14 is a timing diagram illustrating a driving period of the display device 1 of FIG. 12.

The timing controller 210 may further include a timing modulator 216 and a frame memory 217. The timing modulator 216 may directly modulate frame frequencies of a first mode and a second mode and output the modulated frame frequencies. The frame memory 217 may store an image signal RGB provided at a first frame frequency as image data. The timing modulator 216 may receive the image data stored in the frame memory 217 and output modulated image data DATA_M according to a first frame period FOM1 or a second frame period FOM2. This is different from the previous embodiment in which the frame frequencies of the first mode and the second mode are changed by the first mode control signal MO1 and the second mode control signal MO2 of the processor 100. If the processor 100 provides the image signal RGB and control signals having frequencies modulated according to the first mode and the second mode in the previous embodiments, the timing modulator 216 and the frame memory 217 may be omitted.

A processor 100 provides the image signal RGB and control signals to the timing controller 210. The control signals may include an input vertical synchronization signal iVsync and an input horizontal synchronization signal iHsync. The processor 100 may provide the image signal RGB and the input vertical synchronization signal iVsync corresponding to the first frame frequency according to the first mode and the input horizontal synchronization signal iHsync corresponding to a first horizontal period H1 of the first mode regardless of the occurrence of a user's touch. For example, the first frame frequency may be about 120 Hz, and the first horizontal period H1 may be about 3.2 µs, but the disclosure is not limited thereto.

Figure 13:
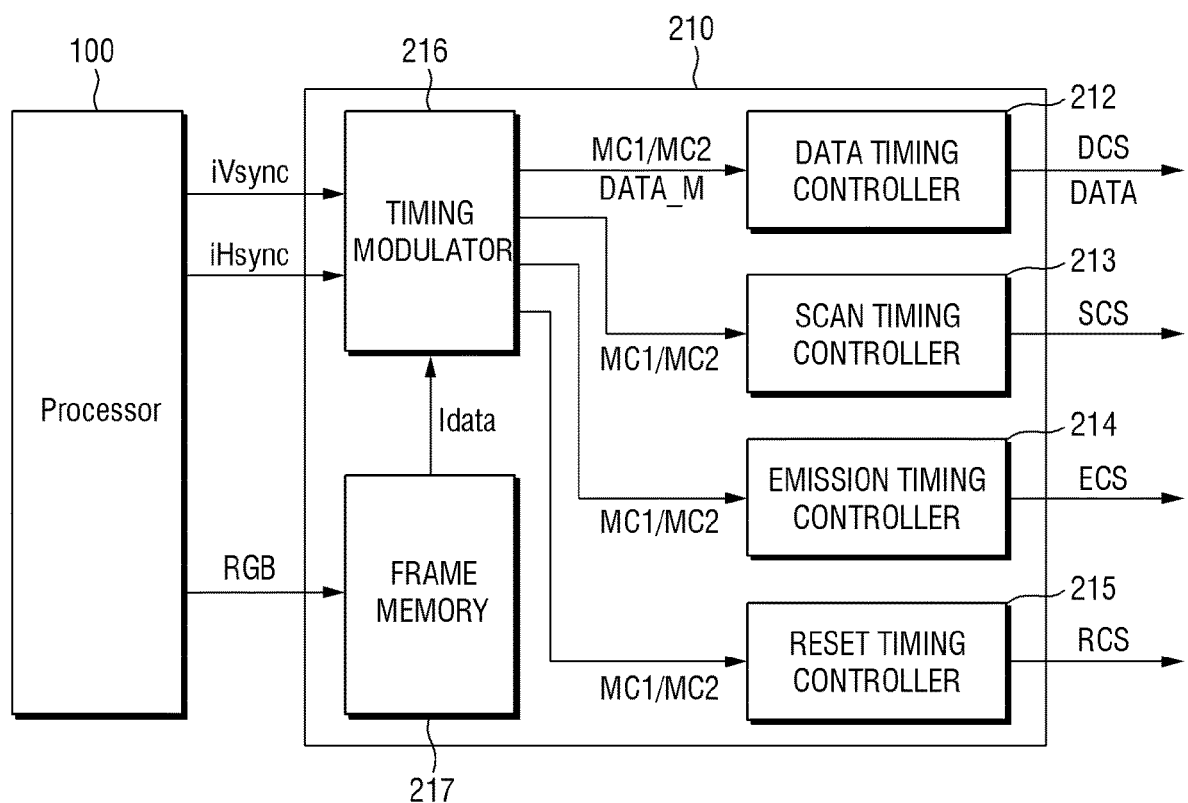
FIG. 13 is a block diagram of a timing controller illustrated in FIG. 12.

Referring to FIG. 12 and FIG. 13, the timing controller 210 may include the timing modulator 216, the frame memory 217, a data timing controller 212, a scan timing controller 213, an emission timing controller 214, and a reset timing controller 215.

The timing modulator 216 receives the input vertical synchronization signal iVsync and the input horizontal synchronization signal iHsync supplied from the processor 100. The timing modulator 216 may provide a first mode control signal MC1 before a user's touch for fingerprint sensing occurs and may modulate the first mode control signal MC1 into a second mode control signal MC2 when the user's touch for fingerprint sensing occurs. Each of the first mode control signal MC1 and the second mode control signal MC2 may be provided to the data timing controller 212, the scan timing controller 213, the emission timing controller 214, and the reset timing controller 215.

The first mode control signal MC1 may include a first output vertical synchronization signal oVsync1 and a first output horizontal synchronization signal oHsync1. The second mode control signal MC2 may include a second output vertical synchronization signal oVsync2 and a second output horizontal synchronization signal oHsync2.

A period of each of the output vertical synchronization signals oVsync (oVsync1 and oVsync2) corresponds to a frame frequency of each period. For example, the first output vertical synchronization signal oVsync1 may define first frame periods FOM1 having the first frame frequency, and the second output vertical synchronization signal oVsync2 may define second frame periods FOM2 having a second frame frequency. In the specification, the first frame frequency may be greater than the second frame frequency. For example, the first frame frequency may be about 120 Hz, and the second frame frequency may be about 30 Hz, but the disclosure is not limited thereto. A period of the first output vertical synchronization signal oVsync1 may be shorter than that of the second output vertical synchronization signal oVsync2. For example, a period of the first output vertical synchronization signal oVsync1 may be about 8.3 ms, and a period of the second output vertical synchronization signal oVsync2 may be about 33.2 ms.

Each of the output horizontal synchronization signals Hsync (oHsync1 and oHsync2) corresponds to horizontal periods in one frame period. For example, the first output horizontal synchronization signal oHsync1 may define first horizontal periods 1H, and the second output horizontal synchronization signal oHsync2 may define second horizontal period 4H. When the first frame frequency is greater than the second frame frequency, a period of the first output horizontal synchronization signal oHsync1 may be shorter than that of the second output horizontal synchronization signal oHsync2. For example, a period of the first output horizontal synchronization signal oHsync1 may be about 3.2 µs, and a period of the second output horizontal synchronization signal oHsync2 may be about 12.8 µs.

The timing modulator 216 may receive image data Idata from the frame memory 217. The image data Idata may be output at the first frame frequency regardless of the occurrence of a user's touch. When a user's touch occurs, the timing modulator 216 may modulate the first frame frequency of the image data Idata into the second frame frequency. The timing modulator 216 may provide the modulated image data DATA_M to the data timing controller 212. When a user's touch does not occur, the timing modulator 216 may provide the image data Idata of the first frame frequency to the data timing controller 212.

The frame memory 217 receives the image signal RGB supplied from the processor 100. The frame memory 217 may store the image signal RGB having the first frame frequency as the image data Idata. The frame memory 217 may store the image data Idata even when a driving frequency of the control signals of the timing controller 210 is different from a driving frequency of the image data Idata. Accordingly, the image data Idata stored in the frame memory 217 may be modulated into the modulated image data DATA_M having the second frame frequency by the timing modulator 216, and the modulated image data DATA_M may be output. When the driving frequency of the image data Idata and the driving frequency of the control signals are the same, the timing modulator 216 may output the image Idata as it is without modulation.

In the second mode, the image signal RGB provided from the processor 100 may be driven at a high frequency (e.g., about 120 Hz), whereas the timing controller 210 modulates the control signals into a low frequency (e.g., about 30 Hz) and provides the modulated control signals. Accordingly, since the image signal RGB is driven faster than each of the control signals, the high-frequency image signal RGB may vanish. The display device 1 including the timing modulator 216 and the frame memory 217 may store the high-frequency image signal RGB in the frame memory 217 and then provide it to the timing modulator 216. Since the timing modulator 216 can modulate the image data Idata according to the high-frequency driving of the first mode or the low-frequency driving of the second mode, it may output image data DATA according to the first output horizontal synchronization signal oHsync1 or the second output horizontal synchronization signal oHsync2.

The data timing controller 212, the scan timing controller 213, the emission timing controller 214, and the reset timing controller 215 may output control signals according to the first mode control signal MC1 and the second mode control signal MC2. For example, the data timing controller 212 may output a data control signal DCS and the image data DATA according to the first mode control signal MC1 and the second mode control signal MC2. The image data DATA may be the image data Idata having the same driving frequency as the first mode control signal MC1 or may be the modulated image data DATA_M having the same driving frequency as the second mode control signal MC2.

The scan timing controller 213 may output a scan control signal SCS according to the first mode control signal MC1 and the second mode control signal MC2. The emission timing controller 214 may output an emission control signal ECS according to the first mode control signal MC1 and the second mode control signal MC2. The reset timing controller 215 may output a reset control signal RCS according to the first mode control signal MC1 and the second mode control signal MC2.

Figure 14:
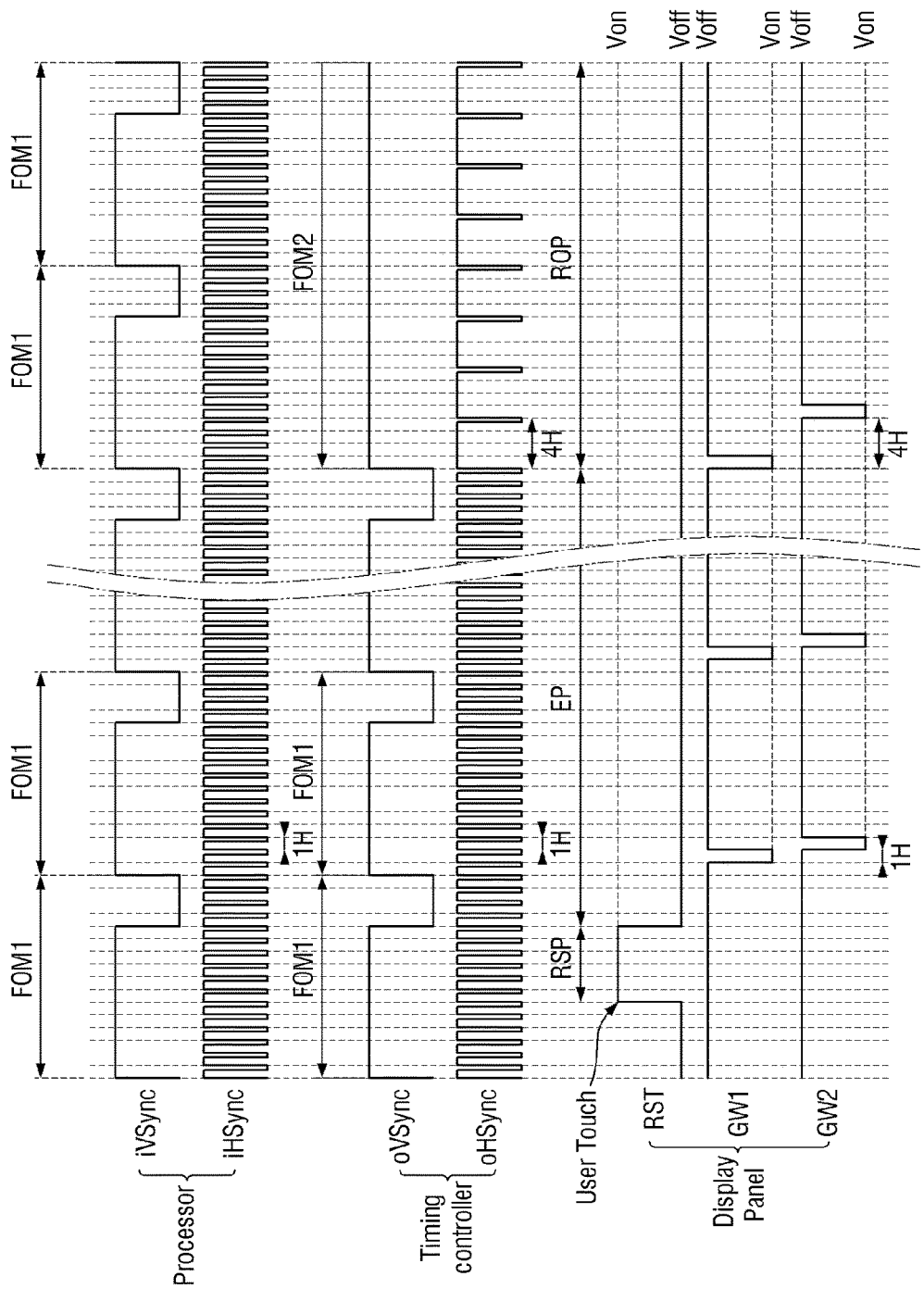
FIG. 14 is a timing diagram illustrating a driving period of the display device of FIG. 12.

Referring to FIG. 14, the processor 100 may repeatedly drive the first frame periods FOM1 and may output the input vertical synchronization signal iVsync of the first frame frequency and the input horizontal synchronization signal iHsync of the first horizontal periods H1. A driving frequency of the processor 100 may be constant at the first frame frequency regardless of the occurrence of a user's touch.

The timing controller 210 repeatedly drives the first frame periods FOM1 according to the first mode and drives one second frame period FOM2 according to the second mode. During the first frame periods FOM1, the timing controller 210 may output the first output vertical synchronization signal oVsync1 of the first frame frequency and the first output horizontal synchronization signal oHsync1 of the first horizontal periods H1. During the second frame period FOM2, the timing controller 210 may output the second output vertical synchronization signal oVsync2 of the second frame frequency and the second output horizontal synchronization signal oHsync2 of the second horizontal periods 4H.

One frame period of photo sensors PS may be divided into a reset period RSP, a light exposure period EP, and a fingerprint readout period ROP. These periods are the same as those described above with reference to FIG. 7, and thus their description will be omitted.

A starting point of the second frame period FOM2 may be the same as a starting point of the fingerprint readout period ROP. The timing modulator 216 of the timing controller 210 may output the first mode control signal MC1 before the fingerprint readout period ROP and may output the second mode control signal MC2 after the fingerprint readout period ROP. Accordingly, one horizontal period between a first scan write signal GW1 and a second scan write signal GW2 output before the fingerprint readout period ROP may have a first horizontal period 1H, and one horizontal period between the first scan write signal GW1 and the second scan write signal GW2 output after the fingerprint readout period ROP may have a second horizontal period 4H.

The timing modulator 216 of the timing controller 210 generally may receive the input vertical synchronization signal iVsync and the input horizontal synchronization signal iHsync and may provide the first mode control signal MC1. In case that a user's touch is sensed, the timing modulator 216 modulates the first mode control signal MC1 into the second mode control signal MC2 and provides the second mode control signal MC2. When the driving frequency is lowered according to the second mode control signal MC2, the fingerprint readout period ROP of the photo sensors PS may be extended. When the fingerprint readout period ROP of the photo sensors PS is extended, the amount of a fingerprint sensing signal Vsignal that can be accumulated in a readout circuit 300 may increase. Therefore, accurate fingerprint sensing data can be output.

In a display device according to embodiments, a driving frequency is changed in a period for reading out a sensing signal of a photo sensor. Therefore, the fingerprint recognition of the display device can be improved.

Embodiments have been disclosed herein, and although terms are employed, they are used and are to be interpreted in a generic and descriptive sense only and not for purpose of limitation. In some instances, as would be apparent by one of ordinary skill in the art, features, characteristics, and/or elements described in connection with an embodiment may be used singly or in combination with features, characteristics, and/or elements described in connection with other embodiments unless otherwise specifically indicated. Accordingly, it will be understood by those of ordinary skill in the art that various changes in form and details may be made without departing from the spirit and scope of the disclosure as set forth in the following claims.

What is claimed is:
1. A display device comprising:
 a display panel comprising:
  scan lines;
  sensing lines;
  pixels electrically connected to each of the scan lines; and
  photo sensors electrically connected to each of the scan lines and the sensing lines;
 a scan driver which outputs scan signals to the scan lines according to a scan control signal;
 a timing controller which outputs the scan control signal to the scan driver; and
 a readout circuit which receives light sensing signals of the photo sensors from the sensing lines, wherein
 the timing controller sets a frame frequency of the scan control signal to a first frame frequency in a first mode in which the display panel displays an image, and
 the timing controller sets the frame frequency of the scan control signal to a second frame frequency different from the first frame frequency in a second mode in which the photo sensors sense a fingerprint, wherein
 the first frame frequency and the second frame frequency are non-zero.

2. The display device of claim 1, wherein the first frame frequency is greater than the second frame frequency.

3. The display device of claim 1, wherein
 n is a positive integer,
 the scan lines comprise:
  a first scan line which provides an n-th scan signal to the pixels and the photo sensors; and a second scan line which provides an (n+1)-th scan signal to the pixels, and a first horizontal period between the n-th scan signal and the (n+1)-th scan signal in the first mode is shorter than a second horizontal period between the n-th scan signal and the (n+1)-th scan signal in the second mode.

4. The display device of claim 1, wherein the second mode comprises:

a reset period in which the photo sensors are reset by a reset signal;

a light exposure period in which the photo sensors are exposed to external light; and a fingerprint readout period in which a fingerprint is read by the readout circuit.

5. The display device of claim 4, wherein the frame frequency of the scan control signal is set to the first frame frequency in the reset period and the light exposure period, and the frame frequency of the scan control signal is set to the second frame frequency in the fingerprint readout period.

6. The display device of claim 4, further comprising:

a reset driver outputting the reset signal for turning on a reset transistor of each of the photo sensors for fingerprint sensing in case that a user's touch is sensed.

7. The display device of claim 1, wherein the readout circuit outputs a first switch signal and outputs a second switch signal, the first switch signal, a scan signal among the scan signals, and the second switch signal are turned on sequentially, and the readout circuit stores a noise voltage according to the first switch signal and stores a sensing signal voltage according to the second switch signal.

8. The display device of claim 7, wherein a driving frequency of each of the first switch signal and the second switch signal output by the readout circuit, and a driving frequency of the scan signal are substantially a same frequency in the second mode.

9. The display device of claim 1, further comprising:

a processor which receives fingerprint sensing data from the readout circuit, wherein the processor transmits a first mode control signal having the first frame frequency in case that a user's touch is not sensed, and the processor transmits a second mode control signal having the second frame frequency in case that the user's touch is sensed.

10. The display device of claim 9, wherein the first mode control signal comprises:

a first vertical synchronization signal having the first frame frequency; and a first horizontal synchronization signal having the first frame frequency, and the second mode control signal comprises:

a second vertical synchronization signal having the second frame frequency; and a second horizontal synchronization signal having the second frame frequency.

11. The display device of claim 10, wherein the timing controller comprises:

a timing modulator which receives control signals having the first frame frequency from the processor, and modulates the control signals into control signals having the second frame frequency in case that a user's touch is sensed.

12. The display device of claim 11, wherein the timing controller comprises a frame memory which receives an image signal having the first frame frequency from the processor and stores the image signal, the frame memory provides the image signal to the timing modulator, and the timing modulator modulates the image signal into an image signal having the second frame frequency in case that a user's touch is sensed.

13. A display device comprising:

a display panel comprising:

a pixel; and a photo sensor;

first scan lines which provide a first scan signal to the pixel and the photo sensor;

second scan lines which provide a second scan signal to the pixel;

a scan driver which outputs the first scan signal to the first scan lines and outputs the second scan signal to the second scan lines;

a timing controller which controls the scan driver; and a readout circuit which receives a light sensing signal from the photo sensor through a sensing line, wherein a pulse interval between the first scan signal and the second scan signal in a first mode in which the display panel displays an image has a first horizontal period, and a pulse interval between the first scan signal and the second scan signal in a second mode in which the photo sensor senses a fingerprint has a second horizontal period, the second horizontal period being different from the first horizontal period.

14. The display device of claim 13, wherein the first frame frequency and the second frame frequency are non-zero, and the first horizontal period is shorter than the second horizontal period.

15. The display device of claim 13, wherein the display panel is controlled with a first frame frequency in the first mode, and the display panel is controlled with a second frame frequency in the second mode.

16. The display device of claim 13, wherein the photo sensor comprises:

a photoelectric converter which includes an anode and a cathode electrically connected to a voltage line;

a first sensing transistor which includes a gate electrode electrically connected to the anode of the photoelectric converter;

a reset transistor which electrically connects a reset voltage line and the anode of the photoelectric converter according to a reset signal; and a second sensing transistor which electrically connects the first sensing transistor and the sensing line according to the first scan signal.

17. The display device of claim 16, wherein the readout circuit comprises:

an amplifier which is electrically connected to the sensing line and includes a first operational amplifier;

a sample/hold circuit which comprises:

a first sampling capacitor storing a noise voltage according to a first switch signal; and a second sampling capacitor storing a sensing signal voltage according to a second switch signal; and an analog-digital (AD) converter which converts a measured sensing signal voltage into digital data.

18. The display device of claim 17, wherein the first switch signal, the first scan signal, and the second switch signal are turned on sequentially.

19. The display device of claim 18, wherein
a sensing signal voltage is output through the sensing line in proportion to an amount of light sensed by the photo sensor in case that the second sensing transistor is turned on according to the first scan signal, and
the sensing signal voltage is stored in the second sampling capacitor according to the second switch signal.

20. The display device of claim 17, wherein
a pulse interval between the first switch signal and an adjacent first switch signal has the second horizontal period, and
a pulse interval between the second switch signal and an adjacent first switch signal each has the second horizontal period.

21. The display device of claim 1, wherein the sensing lines are controlled by the scan lines of the pixels.

* * * * *